United States Patent
Hattori et al.

(10) Patent No.: US 12,314,297 B2
(45) Date of Patent: May 27, 2025

(54) BOOK SEARCH APPARATUS, BOOK SEARCH DATABASE GENERATION APPARATUS, BOOK SEARCH METHOD, BOOK SEARCH DATABASE GENERATION METHOD, AND PROGRAM

(71) Applicant: NIPPON TELEGRAPH AND TELEPHONE CORPORATION, Tokyo (JP)

(72) Inventors: Takashi Hattori, Tokyo (JP); Tessei Kobayashi, Tokyo (JP); Sanae Fujita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/584,916

(22) Filed: Feb. 22, 2024

(65) Prior Publication Data

US 2024/0193193 A1    Jun. 13, 2024

Related U.S. Application Data

(63) Continuation of application No. 17/601,876, filed as application No. PCT/JP2020/013903 on Mar. 27, 2020, now Pat. No. 11,947,580.

(30) Foreign Application Priority Data

Apr. 10, 2019  (JP) ................................. 2019-074577

(51) Int. Cl.
G06F 16/334    (2025.01)
G06F 16/31     (2019.01)
G06F 16/332    (2019.01)

(52) U.S. Cl.
CPC .......... *G06F 16/3344* (2019.01); *G06F 16/31* (2019.01); *G06F 16/332* (2019.01)

(58) Field of Classification Search
CPC .................................................. G06F 16/3344
See application file for complete search history.

(56) References Cited

U.S. PATENT DOCUMENTS

| | | | |
|---|---|---|---|
| 11,947,580 B2 | 4/2024 | Hattori et al. | |
| 2008/0177543 A1* | 7/2008 | Nagano | G10L 15/04 704/E15.005 |

FOREIGN PATENT DOCUMENTS

JP    2017129901 A    7/2017

* cited by examiner

*Primary Examiner* — Van H Oberly

(57) ABSTRACT

Provided is an invention for efficiently searching for books used in training to reduce metathesis. A book search database storage unit 110 stores a book search database in which information identifying a book, information regarding a frequency of a proximity number for a mora character notation pair appearing in forward order in the book, and information regarding a frequency of a proximity number for the mora character notation pair appearing in reverse order are associated with each other. A display unit 300 displays a book search screen including a correctly pronounced phrase input region and an incorrectly pronounced phrase input region. A subject pronunciation designation unit 120 determines two mora character notations and a proximity number to use as search conditions based on an input of the correctly pronounced phrase input region and an input of the incorrectly pronounced phrase input region. A subject book information generation unit 130 generates search results including information regarding books matching the search conditions from the book search database.

6 Claims, 15 Drawing Sheets

FIG. 14

WORDS IN WHICH "ma" AND "ya" ARE INCLUDED IN ORDER AND NUMBER OF PICTURE BOOKS :

| | | |
|---|---|---|
| medamayaki | 10 | SELECT — 351-1 |
| amayadori | 8 | SELECT — 351-2 |
| amayakasu | 3 | SELECT — 351-3 |
| komayaka | 2 | SELECT — 351-4 |
| namayasashii | 1 | SELECT — 351-5 |
| pajyamayasan | 1 | SELECT — 351-6 |

350

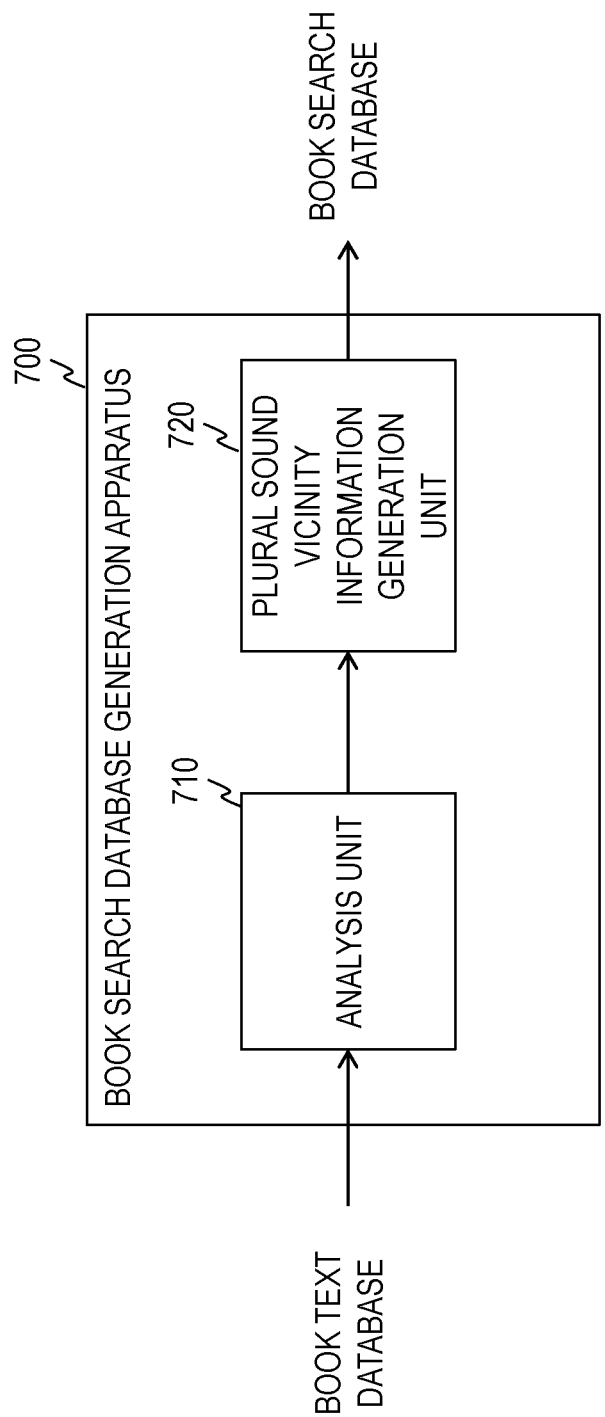

BOOK SEARCH APPARATUS, BOOK SEARCH DATABASE GENERATION APPARATUS, BOOK SEARCH METHOD, BOOK SEARCH DATABASE GENERATION METHOD, AND PROGRAM

CROSS-REFERENCE TO RELATED APPLICATIONS

This application is a divisional application of U.S. patent application Ser. No. 17/601,876, filed on Oct. 6, 2021, which application is a U.S. 371 Application of International Patent Application No. PCT/JP2020/013903, filed on 27 Mar. 2020, which application claims priority to and the benefit of JP Application No. 2019-074577, filed on 10 Apr. 2019, the disclosures of which are hereby incorporated herein by reference in their entireties.

TECHNICAL FIELD

The present invention relates to a technique for searching for books such as, for example, picture books or children's books used to train target persons such as toddlers or children who transpose syllables in speech.

BACKGROUND ART

An example of a technique for searching for books such as picture books or children's books is Patent Literature 1. Patent Literature 1 discloses a technique of searching for books with covers similar to a book subject of a query. According to the technique of Patent Literature 1, it is possible to search for books with pictures favored by the target persons, such as toddlers and children. This makes the target persons, such as toddlers and children, actively read books with pictures they are interested in, and as a result, learn to read words and sentences. In other words, they become able to say various words and sentences, and to understand their meaning.

CITATION LIST

Patent Literature

Patent Literature 1: Japanese Patent Laid-Open No. 2017-129901

SUMMARY OF THE INVENTION

Technical Problem

Children sometimes transpose syllables when they speak. "Transposing syllables" here refers to a speech error where syllables are pronounced in the wrong order, such as saying "oginiri" instead of "onigiri" (rice ball), or "toukoromoshi" instead of "toumorokoshi" (corn). This manner of transposing syllables is also called "metathesis". As mentioned above, the use of books such as picture books and children's books is effective in teaching target persons such as toddlers and children to speak and understand words and sentences. Accordingly, books such as picture books and children's books are expected to be used when performing training to reduce metathesis among target persons such as toddlers and children. For example, reading picture books and children's books to target persons such as toddlers or children, or having the target persons read the books themselves, promotes the toddlers' and children's speaking and understanding of words and sentences, and is expected to make it possible to reduce metathesis.

Using the technique of Patent Literature 1 enables searching for books with pictures favored by the target persons. However, there is a problem in that since it is currently unknown what kind of books can be used to efficiently perform training to reduce metathesis, it is not possible to find books to use in the target persons' training.

It is an object of the present invention to provide a technique allowing for efficient searching for books such as picture books and children's books to be used in training target persons such as toddlers and children to reduce metathesis.

Means for Solving the Problem

A book search apparatus according to a first aspect of the present invention includes:
 a book search database storage unit storing a book search database in which at least information identifying a book and information regarding a frequency of a proximity number for a mora character notation pair appearing in forward order in the book are associated with each other;
 a display unit configured to display a book search screen including a correctly pronounced phrase input region for inputting a string of mora character notations representing a correct pronunciation of a phrase in which metathesis has occurred and an incorrectly pronounced phrase input region for inputting a string of mora character notations representing an incorrect pronunciation of the phrase;
 a subject pronunciation designation unit configured to determine, as search conditions, two mora character notations whose appearance positions are swapped in a correctly pronounced phrase mora character notation string which is the string of mora character notations input into the correctly pronounced phrase input region and an incorrectly pronounced phrase mora character notation string which is the string of mora character notations input into the incorrectly pronounced phrase input region, and a proximity number of the two mora character notations whose appearance positions are swapped in the correctly pronounced phrase mora character notation string and the incorrectly pronounced phrase mora character notation string; and
 a subject book information generation unit configured to generate, from the book search database, search results including information regarding books in which the mora character notation of the two mora character notations included in the search conditions appearing early in the correctly pronounced phrase mora character notation string and the mora character notation of the two mora character notations included in the search conditions appearing later in the correctly pronounced phrase mora character notation string appear in forward order within a vicinity of the proximity number included in the search conditions.

A book search apparatus according to a second aspect of the present invention includes:
 a book search database storage unit storing a book search database in which at least information identifying a book and information regarding a frequency of a proximity number for a mora character notation pair appearing in forward order in the book are associated with each other;

a display unit configured to display a book search screen including two mora input regions for inputting each of two mora character notations in which metathesis has occurred included in a phrase in which metathesis has occurred, and a proximity number input region for inputting a proximity number of the two mora character notations; and a subject book information generation unit configured to generate, from the book search database, search results including information regarding books in which the two mora character notations input into the mora input regions appear within a vicinity of the proximity number input into the proximity number input region.

A book search apparatus according to a third aspect of the present invention includes:

a book search database storage unit storing a book search database in which at least information identifying a book and information regarding a frequency of a proximity number for a mora character notation pair appearing in forward order in the book are associated with each other;

a display unit configured to display a book search screen including input regions for inputting a string of mora character notations representing a correct pronunciation of a phrase in which metathesis has occurred and a string of mora character notations representing an incorrect pronunciation of the phrase, or two mora character notations in which metathesis has occurred in a phrase in which metathesis has occurred, and a proximity number of the two mora character notations;

an intermediate book information generation unit configured to generate, from the book search database, intermediate search results in which, for each word in which the two mora character notations in which metathesis has occurred included in the phrase appear in a correct pronunciation forward order, a notation of the word and a number of books containing the word are associated with each other, make the word selectable and display the word in a word selection screen; and a subject book information generation unit configured to generate final search results including information regarding books containing a word selected in the word selection screen from the book search database.

A book search database generation apparatus according to a fourth aspect of the present invention includes:

an analysis unit configured to, using a book text database in which information identifying a book and a full text of the book are associated with each other as input, generate a string of morphemes through a morphological analysis of the text; and a plural sound vicinity information generation unit configured to associate information regarding a frequency of a proximity number for a mora character notation pair appearing in forward order and information regarding a frequency of a proximity number for the mora character notation pair appearing in reverse order acquired from the string of morphemes of the text with the information identifying the book to generate a book search database.

Effects of the Invention

According to the present invention, it is possible to efficiently search for books such as picture books and children's books to be used in training target persons such as toddlers and children to reduce metathesis.

BRIEF DESCRIPTION OF THE DRAWINGS

FIG. 14 is a drawing showing a display example of a word selection screen.

FIG. 15 is a drawing exemplifying a functional structure of a book search database generation apparatus.

DESCRIPTION OF EMBODIMENTS

Below, embodiments of the present invention are described using example cases in which the language is Japanese and picture books for toddlers are searched for. The morae constituting the smallest units of pronunciation in Japanese are represented by hiragana or katakana. In the below description, the kana notation of morae is referred to as "mora kana notation" (or the character notation of morae is referred to as "mora character notation"). In Japanese, hiragana or katakana notation may be used as the mora kana notation. Since hiragana and katakana notation correspond to each other one-to-one, hiragana notation is used in the below examples of mora kana notation. (As described above, there are 2 kinds of "kana" character in Japanese, which are hiragana and katakana. Here, in the English application, alphabetic character notation is used to explain "kana" character of Japanese language. One "kana" character of Japanese language is expressed by one or more alphabets in alphabetic character notation.) Since mora kana notation expresses morae and not simply kana characters, the mora kana notation of, for example, "hyaku" (hundred) is "hya" and "ku". In other words, when expressing one mora with a plurality of kana characters, such as in the contracted sound "hya", the combination of the plurality of kana characters constitutes the mora kana notation. Accordingly, the kana characters "hi" and "ya" included in the notation "hya" are not mora kana notation.

First Embodiment

Figure 1:
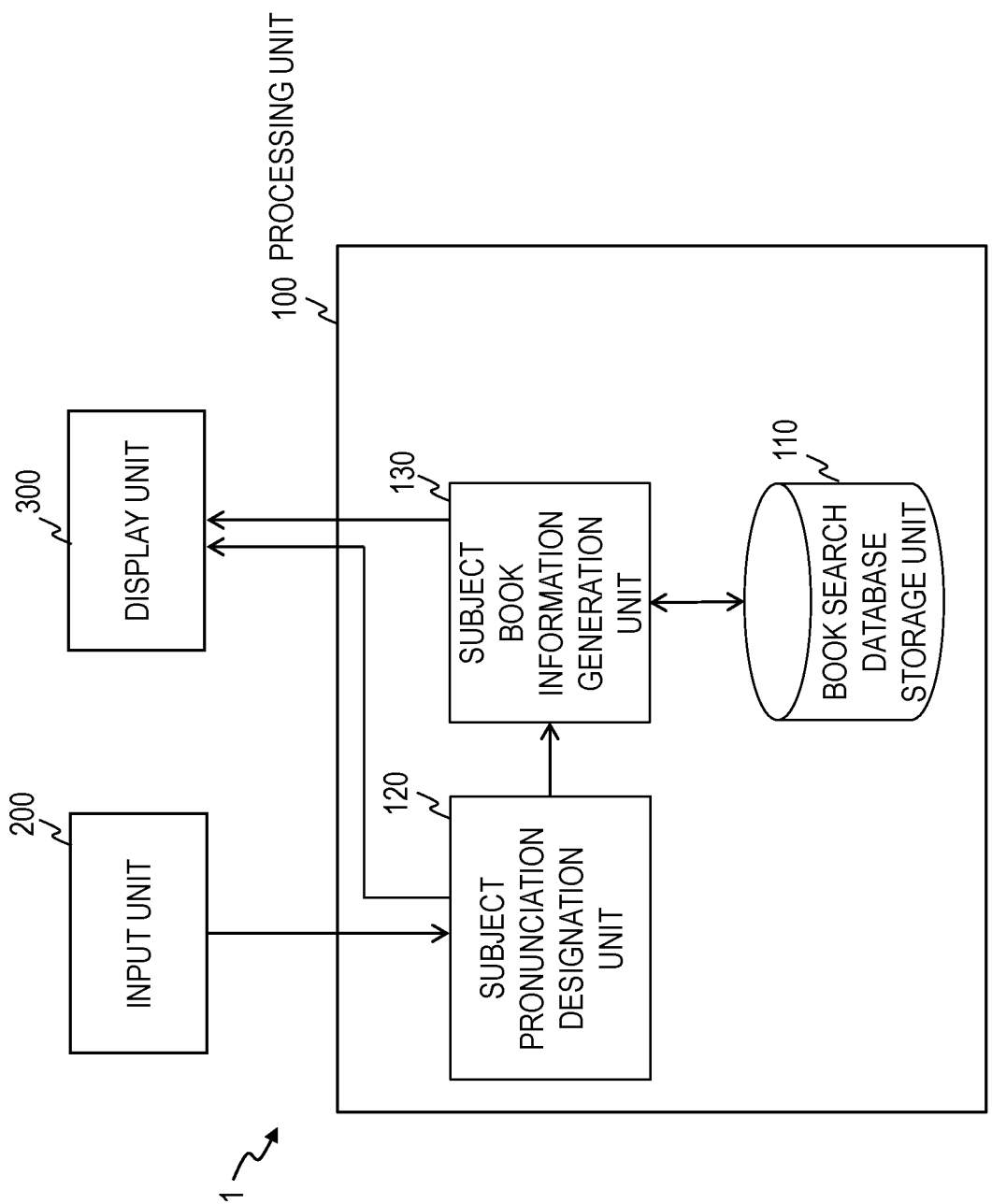
FIG. 1 is drawing exemplifying a functional structure of a book search apparatus according to a first embodiment.

A book search apparatus according to a first embodiment has, for example, like a book search apparatus 1 exemplarily shown in FIG. 1, a processing unit 100, an input unit 200, and a display unit 300. The processing unit 100 includes, for example, a book search database storage unit 110, a subject pronunciation designation unit 120, and a subject book information generation unit 130. The book search apparatus 1 according to the first embodiment, for example, allows a user to set a string of mora kana notations of a phrase in which metathesis has occurred using the input unit 200 while looking at a book search screen displayed on the display unit 300, searches for a picture book according to the string of mora kana notations of the phrase in which metathesis has occurred set by the user to acquire search results, and displays the search results on the display unit 300, allowing the user to comprehend the search results.
Processing Unit 100

The processing unit 100 is realized by, for example, a general-purpose or dedicated computer, including a processor (hardware processor) such as a central processing unit (CPU) and a storage device such as a random-access memory (RAM), a read-only memory (ROM), or a hard disk, executing a certain program. The computer may include one processor and memory, or it may include a plurality of processors and memories. The program may be installed on the computer, or it may be prerecorded in an ROM or the like. Alternatively, rather than circuitry that realizes the functional configuration by loading a program like a CPU, part or all of the processing units may be configured using circuitry that realizes the processing functions without using a program. Circuitry that constitutes one device may include a plurality of CPUs. The input unit 200 is a user interface that receives information input by a user, and the display unit 300 is a user interface that displays information to the user. Examples of the input unit 200 include a mouse, a touch sensor, a touchpad, a keyboard, etc. Examples of the display unit 300 include a liquid crystal display, a projector, etc. Examples of the book search apparatus 1 include a desktop personal computer (PC) including a keyboard and a liquid crystal display or the like, a laptop PC including a keyboard and a liquid crystal display or the like, a tablet PC including a touchscreen (a touch sensor and a liquid crystal display implemented as one piece of hardware), a smartphone, etc., but may also be a dedicated terminal device, etc.
<Book Search Database Storage Unit 110>

In the below description, a set of two mora kana notations are referred to as a "mora kana notation pair", the first mora kana notation of the mora kana notation pair is referred to as a "first mora kana notation", and the second mora kana notation of the mora kana notation pair is referred to as a "second mora kana notation".

The book search database storage unit 110 stores a book search database. The book search database stores, in association with each of a plurality of picture books, information identifying the picture book; in association with each of a certain mora kana notation pair, information regarding how frequently the mora kana notation pair appears in forward order in the vicinity of n (where n is an integer equal to or greater than 1 and equal to or smaller than N, and where N is a predetermined integer equal to or greater than 1); and, in association with each of the certain mora kana notation pair, information regarding how frequently the mora kana notation pair appears in reverse order in the vicinity of n.

"The mora kana notation pair appearing in forward order in the vicinity of n" means that the second mora kana notation appears within n mora kana notations after the first mora kana notation of the mora kana notation pair. In addition, "the mora kana notation pair appearing in reverse order in the vicinity of n" means that the first mora kana notation appears within n mora kana notations after the second mora kana notation of the mora kana notation pair.

The information identifying the picture book includes the title of the book, an image of the book's cover, a string of characters representing the picture book, such as ISBN, ISSN, Japan Book Code, etc., a bar code representing the picture book, etc.

The certain mora kana notation pairs are, for example, all mora kana notation pairs in which each of every mora kana notation in Japanese is the first mora kana notation and each of every mora kana notation in Japanese other than the first mora kana notation is the second mora kana notation. In other words, in this example, the certain mora kana notation pair is 107×106 sets of mora kana notation pairs, in which the first mora kana notation is each of the 107 mora kana notations that exist in Japanese, and the second mora kana notation is each of the 106 mora kana notations that differ from the first mora kana notation.

The certain mora kana notation pairs may also be, for example, a plurality of sets of mora kana notation pairs that are manually selected and predetermined. For example, the certain mora kana notation pair may be a plurality of mora kana notation pairs in which metathesis easily occurs, or a plurality of sets of mora kana notation pairs remaining after those in which metathesis does not easily occur have been eliminated from the 107×106 sets of mora kana notation pairs that exist in Japanese.

The information regarding how frequently a mora kana notation pair appears in forward order in the vicinity of n for each picture book is, for example, a number of appearances of the mora kana notation pair in forward order in the vicinity of n in each picture book, the notation of a word in which the mora kana notation pair appears in forward order in the vicinity of n in each picture book, and the number of appearances of that word in each picture book. Similarly, the information regarding how frequently a mora kana notation pair appears in reverse order in the vicinity of n for each picture book is, for example, a number of appearances of the mora kana notation pair in reverse order in the vicinity of n in each picture book, a word in which the mora kana notation pair appears in reverse order in the vicinity of n in each picture book, and the number of appearances of that word in each picture book.

It should be noted that the information regarding how frequently a certain mora kana notation pair appears in forward order in the vicinity of n is the same as information regarding how frequently a mora kana notation pair in which the first mora kana notation and the second mora kana notation are reversed relative to the aforementioned mora kana notation pair appears in reverse order in the vicinity of n. Likewise, the information regarding how frequently a certain mora kana notation pair appears in reverse order in the vicinity of n is the same as information regarding how frequently a mora kana notation pair in which the first mora kana notation and the second mora kana notation are reversed relative to the aforementioned mora kana notation pair appears in forward order in the vicinity of n. Accordingly, when it comes to information regarding the same frequency, only one of them needs to be stored in the book search database.

In addition, in a case where only a search result of a first example described below is acquired, there is no need to store information regarding how frequently the mora kana notation pair appears in reverse order in the vicinity of n in the book search database for each of the certain mora kana notation pairs.

<Operation of Book Search Apparatus 1>

An operation of the book search apparatus 1 according to the present embodiment is described below.

Figure 2:
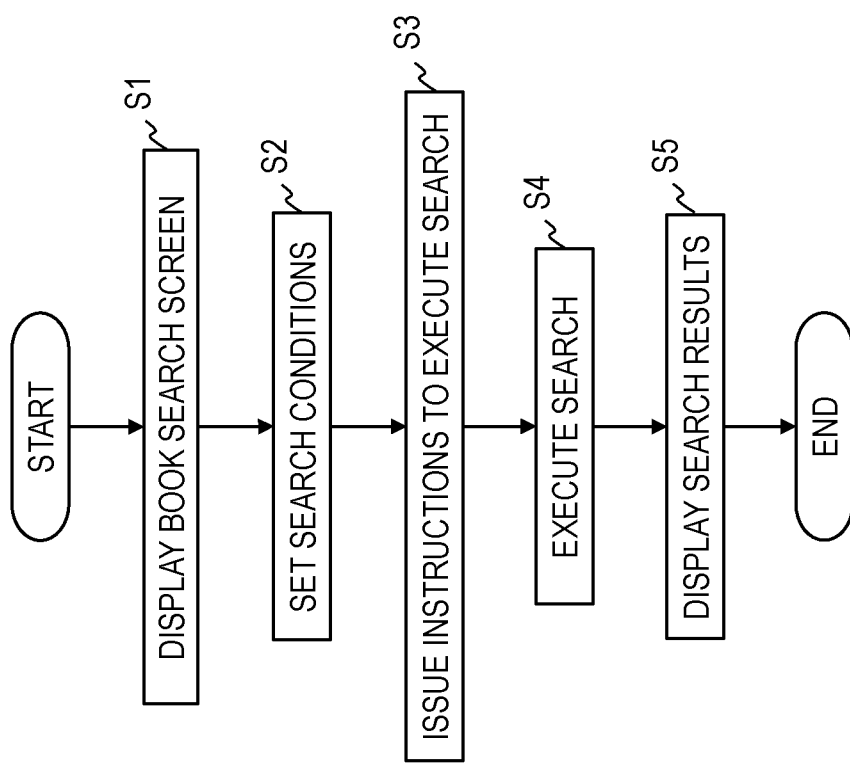
FIG. 2 is a drawing exemplifying a process sequence of a book search method according to the first embodiment.

The book search apparatus 1 starts operation triggered by an activation operation by a user. The activation operation is, for example, an operation in which a power button is pressed, etc. if the book search apparatus 1 is a dedicated terminal device, or an operation in which a program icon is pressed or a URL is designated, etc. if the book search apparatus 1 is a PC. The book search apparatus 1, triggered by the activation operation, first performs the operation of Step S1 described below, and then continues performing operations until Step S5 (see FIG. 2).

<<Display Book Search Screen (Step S1)>>

Upon starting operation, the book search apparatus 1 first displays a book search screen. Specifically, the subject pronunciation designation unit 120 controls the display unit 300 to display the book search screen, and the display unit 300 displays the book search screen according to the control.

Figure 3:
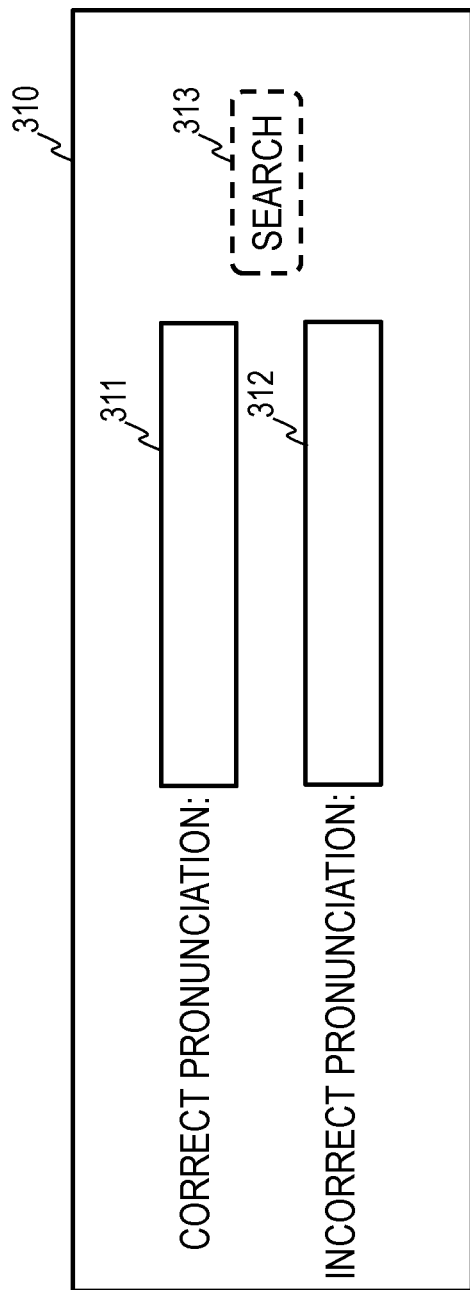
FIG. 3 is a drawing showing a display example of a book search screen according to the first embodiment.

The book search screen according to the present embodiment is a screen for letting a user designate a correct mora kana notation of a phrase in which metathesis has occurred and a mora kana notation including metathesis. The book search screen according to the present embodiment includes, like, for example, a book search screen 310 shown in FIG. 3, a correctly pronounced phrase input region 311 which is a region for inputting a correct mora kana notation string of a phrase in which metathesis has occurred and an incorrectly pronounced phrase input region 312 which is a region for inputting a mora kana notation string including the metathesis of the phrase in which metathesis has occurred, and may include a search button 313 which is a button for issuing an instruction to execute a search.

<<Set Search Conditions (Step S2)>>

Next, the book search apparatus 1 sets search conditions. Specifically, the subject pronunciation designation unit 120 receives an input operation by a user to the input unit 200 with respect to the correctly pronounced phrase input region 311 and the incorrectly pronounced phrase input region 312 in the book search screen displayed on the display unit 300, and sets search conditions according to the input operation received by the input unit 200. The search conditions set by the subject pronunciation designation unit 120 include a search subject first mora kana notation, a search subject second mora kana notation, and a search subject proximity number described below.

<<<Receive Correctly Pronounced Phrase Mora Kana Notation String and Incorrectly Pronounced Phrase Mora Kana Notation String (Step S201)>>>

The input operation by the user to the input unit 200 with respect to the correctly pronounced phrase input region 311 is an operation for designating a correct mora kana notation string for a phrase in which metathesis has occurred. The input operation by the user to the input unit 200 with respect to the incorrectly pronounced phrase input region 312 is an operation for designating a mora kana notation string including the metathesis of the phrase in which metathesis has occurred. Receipt of the input operations by the user to the input unit 200 respectively with respect to the correctly pronounced phrase input region 311 and the incorrectly pronounced phrase input region 312 may be carried out by receiving key input operations of the mora kana notation strings.

The subject pronunciation designation unit 120 first receives a kana notation string consisting of a hiragana or katakana (which is expressed by one or more alphabets) representing a mora designated by the user's input operation to the input unit 200 with respect to the correctly pronounced phrase input region 311 as a correctly pronounced phrase mora kana notation string, and receives a kana notation string consisting of a hiragana or katakana (which is expressed by one or more alphabets) representing a mora designated by the user's input operation to the input unit 200 with respect to the incorrectly pronounced phrase input region 312 as an incorrectly pronounced phrase mora kana notation string.

Since the subject of the present invention is metathesis, the correctly pronounced phrase mora kana notation string and the incorrectly pronounced phrase mora kana notation string satisfy the conditions of the number of included mora kana notations being the same, all included mora kana notations being the same, and two appearance locations of the included mora kana notations being swapped. Accordingly, in a case where the received correctly pronounced phrase mora kana notation string and incorrectly pronounced phrase mora kana notation string do not satisfy these conditions, the subject pronunciation designation unit 120 may be configured to additionally display information notifying the user that there is an error in the input operation on the book search screen displayed on the display unit 300.

<<<Set Search Subject First Mora Kana Notation and Search Subject Second Mora Kana Notation (Step S202)>>>

Next, the subject pronunciation designation unit 120 extracts two mora kana notations whose appearance positions are swapped in the correctly pronounced phrase mora kana notation string and the incorrectly pronounced phrase mora kana notation string, sets the mora kana notation of the two extracted mora kana notations that appears early in the correctly pronounced phrase mora kana notation string as a search subject first mora kana notation, and sets the mora kana notation that appears later as a search subject second mora kana notation.

<<<Set Proximity Number (Step S203)>>>

The subject pronunciation designation unit 120 also sets the number, which is obtained by adding 1 to a number of mora kana notations between the two mora kana notations whose appearance positions are swapped in the correctly pronounced phrase mora kana notation string and the incorrectly pronounced phrase mora kana notation string, as a search subject proximity number.

[[Example of Setting Search Conditions (Step S2)]]

For example, in the event of metathesis in which a target person who is an toddler pronounces the word "takashimaya" (name of a department store) as "takashiyama", a user, such as a caretaker of the toddler, may input "takashimaya" into the correctly pronounced phrase input region 311, and input "takashiyama" into the incorrectly pronounced phrase input region 312. In this case, the subject pronunciation designation unit 120 receives "takashimaya" as the correctly pronounced phrase mora kana notation string and "takashiyama" as the incorrectly pronounced phrase mora kana notation string (Step S201). Next, the subject pronunciation designation unit 120 extracts the two mora kana notations "ma" and "ya" whose appearance positions are swapped in the correctly pronounced phrase mora kana notation string "takashimaya" and the incorrectly pronounced phrase mora kana notation string "takashiyama", sets the "ma" of the extracted "ma" and "ya" which appears early in the correctly pronounced phrase mora kana notation string "takashimaya" as the search subject first mora kana notation, and sets the "ya" which appears later as the search subject second mora kana notation (Step S202). The subject pronunciation designation unit 120 also sets the number, which is 1, which is obtained by adding 1 to the number, which is 0, of mora kana notations between the "ma" and "ya" whose appearance positions are swapped in the correctly pronounced phrase mora kana notation "takashimaya" and the incorrectly pronounced phrase mora kana notation "takashiyama", as the search subject proximity number (Step S203).

<<Issue Instructions to Execute Search (Step S3)>>

A press operation by a user to the input unit 200 with respect to the search button 313 is an operation for issuing an instruction to execute a search. When a press operation has been made with respect to the search button 313, the subject pronunciation designation unit 120 outputs the set search subject first mora kana notation, search subject second mora kana notation, and search subject proximity number as search conditions to the subject book information generation unit 130.

It should be noted that in a case where the book search screen 310 does not include the search button 313, the subject pronunciation designation unit 120 may use, for example, a right-click of a mouse or a press operation of the Return key of a keyboard instead of a press operation with respect to the search button 313 as described above, or it may output the set search subject first mora kana notation, search subject second mora kana notation, and search subject proximity number as search conditions to the subject book information generation unit 130 triggered by receiving input operations with respect to all the input regions.

<<Execute Search (Step S4)>>

Next, the book search apparatus 1 executes the search. Specifically, the subject book information generation unit 130 acquires search results corresponding to the input search conditions, and generates a search results screen including the search results and outputs the search results screen to the display unit 300. After the description regarding displaying the search results (Step S5), examples of the search results acquired by the subject book information generation unit 130 is described. It should be noted that in each example, the proximity number included in the search conditions input into the subject book information generation unit 130 is M (M being a positive integer).

<<Display Search Results (Step S5)>>

Next, the book search apparatus 1 displays the search results. Specifically, the display unit 300 displays the input search results screen.

First Example of Search Results According to First Embodiment

A first example of search results according to the first embodiment is search results regarding the frequency at which a set of two mora kana notations in which metathesis has occurred appears in a correct pronunciation forward order in a picture book.

The subject book information generation unit 130 searches a book search database stored in the book search database storage unit 110 based on the input search subject first mora kana notation, search subject second mora kana notation, and search subject proximity number M, and generates and outputs a search results screen including, as search results, sets of information identifying a picture book, and a number of appearances of the search subject first mora kana notation and the search subject second mora kana notation in forward order within the vicinity of M, that is to say the number of appearances of the set of two mora kana notations in which metathesis has occurred in the correct pronunciation forward order within the vicinity of M. For example, if the search subject first mora kana notation is "ma", the search subject second mora kana notation is "ya", and the search subject proximity number is "1", then the subject book information generation unit 130 generates and outputs a search results screen including as search results sets of, for each picture book, the title of the picture book and the number of times the picture book includes "maya".

It should be noted that the subject book information generation unit 130 may also produce search results that include in the aforementioned sets, the notation of a word in which the search subject first mora kana notation and the search subject second mora kana notation appear in forward order within the vicinity of M and the number of appearances of that word, in other words, the notation of a word in which the set of two mora kana notations in which metathesis has occurred appears in the correct pronunciation forward order within the vicinity of M and the number of appearances of that word. For example, if the search subject first mora kana notation is "ma", the search subject second mora kana notation is "ya", and the search subject proximity number is "1", then the subject book information generation unit 130 may generate and output a search results screen including as search results sets of, for each picture book, the title of the picture book, the number of times the picture book includes "maya", the notation of each word including "maya" in the picture book, and the number of times the picture book includes each of these words (for example, if the picture book includes the notation "maya" in the form of the word "Maya", this means the notation of the word "Maya" and the number of times the picture book includes the word "Maya").

Alternatively, the subject book information generation unit 130 may forego including the number of appearances of the set of two mora kana notations in which metathesis has occurred in the correct pronunciation forward order within the vicinity of M, and produce search results of sets of information identifying the picture book, the notation of a word in which the set of two mora kana notations in which metathesis has occurred appears in the correct pronunciation forward order within the vicinity of M, and the number of appearances of that word. For example, the subject book information generation unit 130 may generate and output a search results screen including as search results sets of, for each picture book, the title of the picture book, the notation of each word including "maya" in the picture book, and the number of times the picture book includes each of these words (for example, if the picture book includes the notation "maya" in the form of the word "Maya", this means the notation of the word "Maya" and the number of times the picture book includes the word "Maya").

While the same applies for the Second Example described below, the search results screen may include picture books at a higher priority the higher the frequency at which the set of two mora kana notations in which metathesis occurs appears in forward order, for example, in descending order by the number of appearances of the search subject first mora kana notation and the search subject second mora kana notation in forward order within the vicinity of M, or in descending order by the number of appearances of a word in which the search subject first mora kana notation and the search subject second mora kana notation appear in forward order within the vicinity of M. Alternatively, the search results screen may only include search results regarding picture books in which a mora kana notation pair appears in forward order within the vicinity of M, in which the first mora kana notation is the input search subject first mora kana notation and the second mora kana notation is the input search subject second mora kana notation.

While the same applies for subsequent search result screens, in case the search results screen cannot completely fit into the screen of the display unit 300, it is of course possible to employ well-known screen display technology, such as adding a scroll bar to make the screen scrollable, etc.

It is plausible that an toddler who says "yama" although the correct forward order is "maya" may have come across "maya" less frequently than "yama" in the words and sentences the toddler has seen or heard, and that the cause of the metathesis thus is that the toddler has mistaken the unfamiliar "maya" for the more familiar "yama". It can therefore be expected that by reading to the toddler or making the toddler read picture books containing "maya" would make for efficient training to reduce the occurrence of metathesis. To that end, search results regarding picture books containing at least "maya", in other words, search results regarding a frequency at which the set of two mora kana notations in which metathesis has occurred appears in the correct pronunciation forward order in a picture book, are presented, as in, for example, the search results of the First Example, and further, a search results screen including picture books at a higher priority the higher the frequency at which the picture book includes "maya", in other words, the higher the frequency at which "maya" appears in the correct pronunciation forward order.

Second Example of Search Results According to First Embodiment

The Second Example of the search results according to the first embodiment also concerns search results including a frequency at which set of two mora kana notations in which metathesis has occurred appears in the correct pronunciation forward order in a picture book, but differs from the First Example in that the search results also include a frequency at which the set of two mora kana notations in which metathesis has occurred appears in an incorrect forward order in the picture book, in other words, the forward order in which metathesis has occurred.

The subject book information generation unit 130 searches a book search database stored in the book search database storage unit 110 based on the input search subject first mora kana notation, search subject second mora kana notation, and search subject proximity number M, and generates and outputs a search results screen including, as search results, sets of information identifying a picture book, a number of appearances of the search subject first mora kana notation and the search subject second mora kana notation in forward order within the vicinity of M, that is to say the number of appearances of the set of two mora kana notations in which metathesis has occurred in the correct pronunciation forward order within the vicinity of M, and a number of appearances of the search subject first mora kana notation and the search subject second mora kana notation in reverse order within the vicinity of M, that is to say the number of appearances of the set of two mora kana notations in which metathesis has occurred in the incorrect pronunciation forward order within the vicinity of M. For example, if the search subject first mora kana notation is "ma", the search subject second mora kana notation is "ya", and the search subject proximity number is "1", then the subject book information generation unit 130 generates and outputs a search results screen including as search results sets of, for each picture book, the title of the picture book, the number of times the picture book includes "maya", and the number of times the picture book includes "yama".

It should be noted that the subject book information generation unit 130 may also produce search results that include in the aforementioned sets the notation of a word in which the search subject first mora kana notation and the search subject second mora kana notation appear in reverse order within the vicinity of M and the number of appearances of that word, in other words, the notation of a word in which the set of two mora kana notations in which metathesis has occurred appears in the incorrect pronunciation forward order within the vicinity of M and the number of appearances of that word. For example, if the search subject first mora kana notation is "ma", the search subject second mora kana notation is "ya", and the search subject proximity number is "1", then the subject book information generation unit 130 may generate and output a search results screen including as search results sets of, for each picture book, the title of the picture book, the number of times the picture book includes "maya", the notation of each word including "maya" in the picture book, the number of times the picture book includes each of these words (for example, if the picture book includes the notation "maya" in the form of the word "Maya", this means the notation of the word "Maya" and the number of times the picture book includes the word "Maya"), the number of times the picture book includes "yama", the notation of each word including "yama" in the picture book, and the number of times the picture book includes each of these words (for example, if the picture book includes the notation "yama" in the form of the word "yama" (mountain), this means the notation of the word "yama" and the number of times the picture book includes the word "yama").

Alternatively, the subject book information generation unit 130 may forego including the number of appearances of the set of two mora kana notations in which metathesis has occurred in the incorrect pronunciation forward order within the vicinity of M, and produce search results of sets of information identifying the picture book, the notation of a word in which the set of two mora kana notations in which metathesis has occurred appears in the correct pronunciation forward order within the vicinity of M and the number of appearances of that word, and the notation of a word in which the set of two mora kana notations in which metathesis has occurred appears in the incorrect pronunciation forward order within the vicinity of M and the number of appearances of that word.

Second Embodiment

In the first embodiment, the search results are acquired based on a mora kana notation string of a phrase in which metathesis has occurred, but the search results may also be acquired based on a kana notation of a mora in which metathesis has occurred. This embodiment is described as the second embodiment.

A book search apparatus 1 according to the second embodiment has the same structure as the book search apparatus according to the first embodiment, and is, for example, the book search apparatus 1 shown in FIG. 1. The book search apparatus 1 according to the second embodiment, for example, allows a user to set a kana notation of a mora in which metathesis has occurred using the input unit 200 while looking at a book search screen displayed on the display unit 300, searches for a picture book according to the kana notation of the mora in which metathesis has occurred to acquire search results, and displays the search results on the display unit 300, allowing the user to comprehend the search results. Since the difference of the book search apparatus 1 according to the second embodiment from the book search apparatus 1 according to the first embodiment lies in the contents of its operation, the operation of the book search apparatus 1 according to the second embodiment will be described below.

<Operation of Book Search Apparatus 1>

An operation of the book search apparatus 1 according to the present embodiment is described below.

The book search apparatus 1 starts operation triggered by an activation operation by a user. The activation operation is, for example, an operation in which a power button is pressed, etc. if the book search apparatus 1 is a dedicated terminal device, or an operation in which a program icon is pressed or a URL is designated, etc. if the book search apparatus 1 is a PC. The book search apparatus 1, triggered by the activation operation, first performs the operation of Step S1 described below, and then continues performing operations until Step S5 (see FIG. 2).

<<Display Book Search Screen (Step S1)>>

Upon starting operation, the book search apparatus 1 first displays a book search screen. Specifically, the subject pronunciation designation unit 120 controls the display unit 300 to display the book search screen, and the display unit 300 displays the book search screen according to the control.

The book search screen according to the present embodiment is a screen for letting a user designate a first mora kana notation and a second mora kana notation in a correct pronunciation of a set of two mora kana notations in which metathesis has occurred and a proximity number of these two mora kana notations. The book search screen according to the present embodiment includes, like, for example, a book search screen 320A shown in FIG. 4, a first mora input region 321 which is a region for inputting the first mora kana notation in the correct pronunciation of the set of two mora kana notations in which metathesis has occurred, a second mora input region 322 which is a region for inputting the second mora kana notation in the correct pronunciation of the set of two mora kana notations in which metathesis has occurred, and a proximity number input region 323 which is a region for inputting the proximity number of the set of two mora kana notations in which metathesis has occurred, and may include a search button 324 which is a button for issuing an instruction to execute a search.

Figure 5:
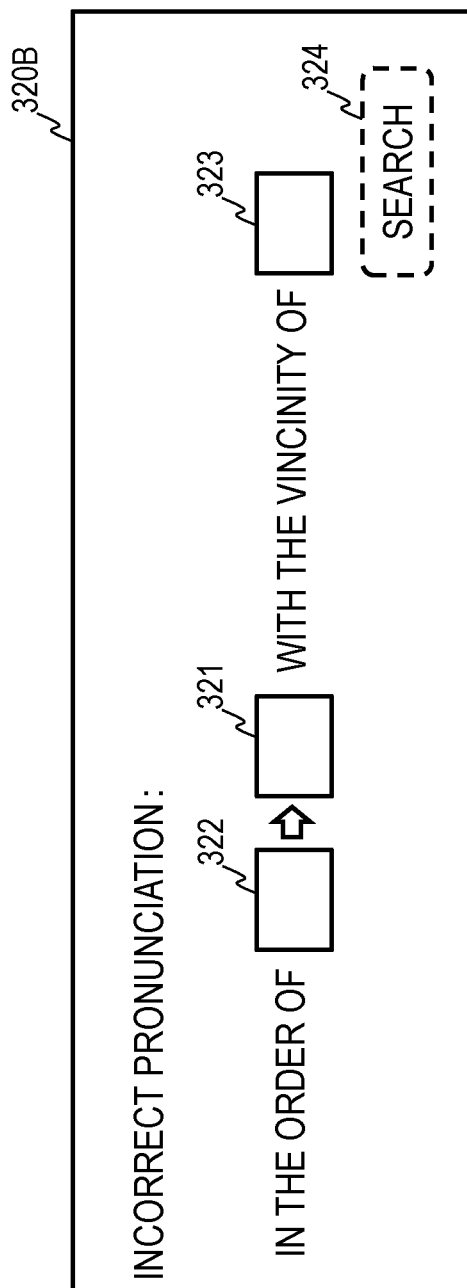
FIG. 5 is a drawing showing a display example of a book search screen according to the second embodiment.

Alternatively, the book search screen according to the present embodiment may include, like, for example, a book search screen 320B shown in FIG. 5, a second mora input region 322 which is a region for inputting the first mora kana notation in an incorrect pronunciation of the set of two mora kana notations in which metathesis has occurred, a first mora input region 321 which is a region for inputting the second mora kana notation in the incorrect pronunciation of the set of two mora kana notations in which metathesis has occurred, and a proximity number input region 323 which is a region for inputting the proximity number of the set of two mora kana notations in which metathesis has occurred, and may include a search button 324 which is a button for issuing an instruction to execute a search.

<<Set Search Conditions (Step S2)>>

Next, the book search apparatus 1 sets search conditions. Specifically, the subject pronunciation designation unit 120 receives input operations by a user to the input unit 200 with respect to the first mora input region 321, the second mora input region 322, and the proximity number input region 323 in the book search screen displayed on the display unit 300, and sets search conditions according to the input operations received by the input unit 200. The search conditions set by the subject pronunciation designation unit 120 include a search subject first mora kana notation, a search subject second mora kana notation, and a search subject proximity number described below.

<<<Search Subject First Kana Mora Notation and Search Subject Second Kana Mora Notation>>>

Figure 4:
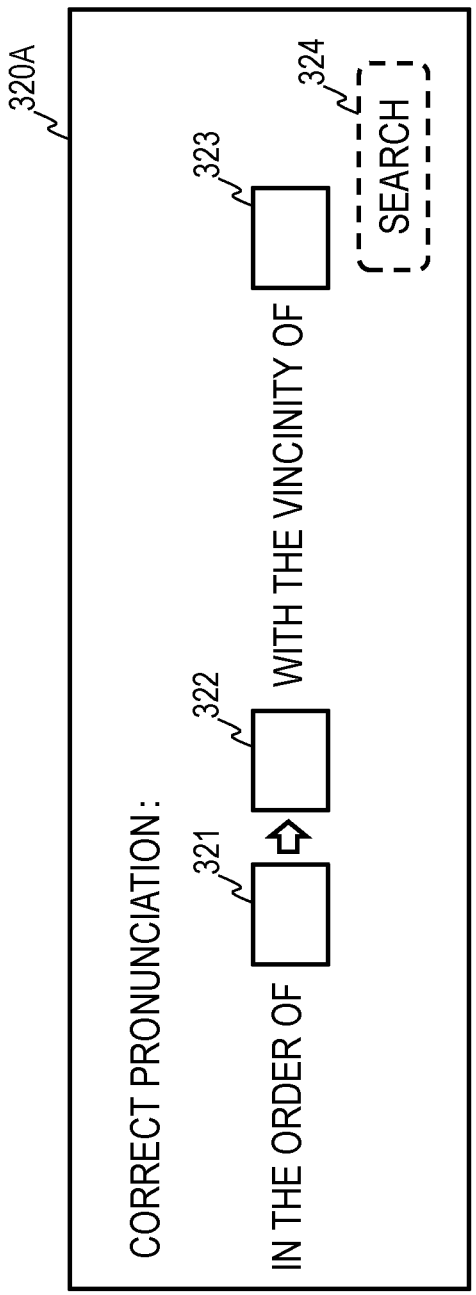
FIG. 4 is a drawing showing a display example of a book search screen according to a second embodiment.

In the case of the book search screen of FIG. 4, the input operation by the user to the input unit 200 with respect to the first mora input region 321 is an operation for designating the first mora kana notation in the correct pronunciation of the set of two mora kana notations in which metathesis has occurred, and the input operation by the user to the input unit 200 with respect to the second mora input region 322 is an operation for designating the second mora kana notation in the correct pronunciation of the set of two mora kana notations in which metathesis has occurred. In the case of the book search screen of FIG. 5, the input operation by the user to the input unit 200 with respect to the first mora input region 321 is an operation for designating the second mora kana notation in the incorrect pronunciation of the set of two mora kana notations in which metathesis has occurred, and the input operation by the user to the input unit 200 with respect to the second mora input region 322 is an operation for designating the first mora kana notation in the incorrect pronunciation of the set of two mora kana notations in which metathesis has occurred.

It should be noted that judging by the relation between the mora kana notations in the correct pronunciation and incorrect pronunciation of the set of two mora kana notations in which metathesis has occurred, if the set of two mora kana notations in which metathesis has occurred are the same, then the mora kana notation designated by the first mora input region 321 is the same in either of the book search screens of FIG. 4 and FIG. 5, and the mora kana notation designated by the second mora input region 322 is the same in either of the book search screens of FIG. 4 and FIG. 5. Since the input operation by the user to the input unit 200 with respect to the first mora input region 321 and the second mora input region 322 is an operation for designating a set of two mora kana notations in which metathesis has occurred, it is an operation for designating a different mora in each input region.

The input operation by the user to the input unit 200 with respect to each of the first mora input region 321 and the second mora input region 322 may be received by a key input operation of one mora kana notation, or by a selection input operation in which a pull-down list of kana notations in hiragana or katakana for a plurality of candidate mora is displayed and the user selects using a mouse, etc.

The subject pronunciation designation unit 120 sets a kana notation of a mora in hiragana or katakana designated by the input operation by the user to the input unit 200 with respect to the first mora input region 321 as the search subject first mora kana notation. Further, the subject pronunciation designation unit 120 sets a kana notation of a mora in hiragana or katakana designated by the input operation by the user to the input unit 200 with respect to the second mora input region 322 as the search subject second mora kana notation.

<<<Proximity Number>>>

The input operation by the user to the input unit 200 with respect to the proximity number input region 323 is an operation for designating the proximity number of the designated two morae. The subject pronunciation designation unit 120 sets a numerical value designated by the input operation by the user to the input unit 200 with respect to the proximity number input region 323 as the search subject proximity number. Receipt of the input operation by the user to the input unit 200 with respect to the proximity number input region 323 may be carried out by receiving a character input of a positive integer through a key input operation, etc. by the user, or by a selection input operation in which a pull-down list of a plurality of candidate positive integers are displayed and the user selects using a mouse, etc.

[[Example of Setting Search Conditions (Step S2)]]

For example, in the event of metathesis in which a target person who is an toddler pronounces the word "takashimaya" as "takashiyama", a user, such as a caretaker of the toddler, may input "ma" into first mora input region 321, input "ya" into the second mora input region 322, and input "1" into the proximity number input region 323. In this case, the subject pronunciation designation unit 120 sets "ma" as the search subject first mora kana notation, "ya" as the search subject second mora kana notation, and "1" as the search subject proximity number.

<<Issue Instructions to Execute Search (Step S3)>>

A press operation by a user to the input unit 200 with respect to the search button 324 is an operation for issuing an instruction to execute a search. When a press operation has been made with respect to the search button 324, the subject pronunciation designation unit 120 outputs the set search subject first mora kana notation, search subject second mora kana notation, and search subject proximity number as search conditions to the subject book information generation unit 130.

It should be noted that in a case where the book search screen 310 does not include the search button 324, then, like in the first embodiment, instead of the press operation with respect to the search button 324 described above, for example, the subject pronunciation designation unit 120 may use a right-click of a mouse or a press operation of the Return key of a keyboard, or output the set search subject first mora kana notation, search subject second mora kana notation, and search subject proximity number as search conditions to the subject book information generation unit 130 triggered by receiving input operations with respect to all the input regions.

<<Execute Search (Step S4)>>

Next, the book search apparatus 1 executes the search. Specifically, the subject book information generation unit 130 acquires search results corresponding to the input search conditions, and generates a search results screen including the search results and outputs the search results screen to the display unit 300. The search results acquired by the subject book information generation unit 130 are the same as the search results of the first embodiment, and examples of the search results acquired by the subject book information generation unit 130 are the First Example and Second Example of the first embodiment.

<<Display Search Results (Step S5)>>

Next, the book search apparatus 1 displays the search results. Specifically, the display unit 300 displays the input search results screen.

First Modified Example of Second Embodiment

In the second embodiment, an embodiment in which the user designates the order of the mora kana notations in the set of two is described, but designation of the order of the mora kana notations in the set of two does not have to be done by the user. Such an embodiment is referred to as a first modified example of the second embodiment, and the differences thereof from the second embodiment are described below.

<<<Book Search Screen>>>

The book search screen according to the present modified example is a screen for letting a user designate a set of two mora kana notations in which metathesis has occurred and a proximity number of these two mora kana notations. The book search screen according to the present modified example includes, like, for example, a book search screen 320C shown in FIG. 6, a first mora input region 325 which is a region for inputting one of the mora kana notations of the set of two mora kana notations in which metathesis has occurred, a second mora input region 326 which is a region for inputting the other mora kana notation of the set of two mora kana notations in which metathesis has occurred, and a proximity number input region 323 which is a region for inputting the proximity number of the set of two mora kana notations in which metathesis has occurred, and may include a search button 324 which is a button for issuing an instruction to execute a search.

<<Set Search Conditions (Step S2)>>

The subject pronunciation designation unit 120 of the book search apparatus 1 receives input operations by a user to the input unit 200 with respect to the first mora input region 325, the second mora input region 326, and the proximity number input region 323 in the book search screen displayed on the display unit 300, and sets search conditions according to the input operations received by the input unit 200. The search conditions set by the subject pronunciation designation unit 120 include a search subject first mora kana notation, a search subject second mora kana notation, and a search subject proximity number described below.

<<<Search Subject First Mora Kana Notation and Search Subject Second Mora Kana Notation>>>

Figure 6:
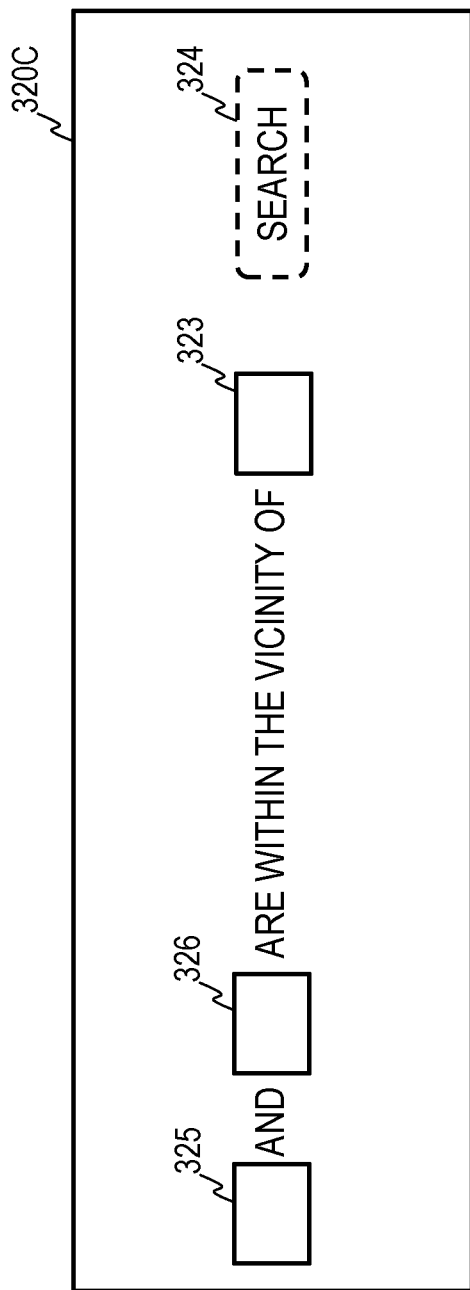
FIG. 6 is a drawing showing a display example of a book search screen according to a first modified example of the second embodiment.

In the case of the book search screen of FIG. 6, the input operation by the user to the input unit 200 with respect to the first mora input region 325 is an operation for designating one of the mora kana notations of the set of two mora kana notations in which metathesis has occurred, and the input operation by the user to the input unit 200 with respect to the second mora input region 326 is an operation for designating the other mora kana notation of the set of two mora kana notations in which metathesis has occurred.

The subject pronunciation designation unit 120 sets the kana notation of the mora in hiragana or katakana designated in the input operation by the user to the input unit 200 with respect to the first mora input region 325 as the search subject first mora kana notation, and sets the kana notation of the mora in hiragana or katakana designated in the input operation by the user to the input unit 200 with respect to the second mora input region 326 as the search subject second mora kana notation.

Search Results of First Modified Example of Second Embodiment

The search results of the present modified example are search results regarding picture books in which the set of two mora kana notations in which metathesis has occurred appears. For example, the subject book information generation unit 130 searches the book search database stored in the book search database storage unit 110 based on the input search subject first mora kana notation, search subject second mora kana notation, and search subject proximity number M, and generates and outputs a search results screen including a set of information identifying the picture book, the number of appearances of the search subject first mora kana notation and the search subject second mora kana notation in forward order within the vicinity of M, and the number of appearances of the search subject first mora kana notation and the search subject second mora kana notation in reverse order within the vicinity of M, as a search result, regarding picture books in which a mora kana notation pair in which the first mora kana notation is the input search subject first mora kana notation and the second mora kana notation is the input search subject second mora kana notation appears within the vicinity of M. In other words, the search results include the number of appearances of the set of two mora kana notations in which metathesis has occurred both in the correct forward order and in the incorrect forward order.

For example, if the input first mora kana notation is "ma", the input second mora kana notation is "ya", and the input proximity number is "1", then the subject book information generation unit 130 generates and outputs a search results screen including as search results sets of, for each picture book that includes at least either of "maya" and "yama", the title of the picture book, the number of times the picture book includes "maya", and the number of times the picture book includes "yama".

The subject book information generation unit 130 may also produce search results that include in the aforementioned sets the notation of a word in which the search subject first mora kana notation and the search subject second mora kana notation appear in forward order within the vicinity of M and the number of appearances of that word, and the notation of a word in which the search subject first mora kana notation and the search subject second mora kana notation appear in reverse order within the vicinity of M and the number of appearances of that word. Alternatively, the subject book information generation unit 130 may forego including the number of appearances of the set of two mora kana notations in which metathesis has occurred within the vicinity of M, and output sets of information identifying the picture book, the notation of a word in which the search subject first mora kana notation and the search subject second mora kana notation appear in forward order within the vicinity of M and the number of appearances of that word, and the notation of a word in which the search subject first mora kana notation and the search subject second mora kana notation appear in reverse order within the vicinity of M and the number of appearances of that word.

The book search apparatus 1 itself cannot know which is the correct forward order and which is the incorrect forward order. However, since the user uses the book search apparatus 1 knowing which is the correct forward order and which is the incorrect forward order, the user can comprehend which is the number of appearances in the correct forward order and which is the number of appearances in the incorrect forward order by looking at the search results screen displayed on the display unit 300.

Second Modified Example of Second Embodiment

In the two morae that constitute a set of two mora in which metathesis occurs, it is often the case that the consonants differ, but the vowels are the same. Therefore, when employing a list view in the form of a pull-down list, etc. of candidate mora kana notations and a selection input operation by the user as the configuration for receiving input operations by the user with respect to each of the first mora input region and the second mora input region in the second embodiment and the first modified example thereof, it may be configured so that a list, such as a pull-down list of mora kana notations including only kana notations of morae in which the vowels are the same as in a mora of the first mora input region or the second mora input region that first received an input operation, is displayed in the other input region. Such an embodiment is referred to as a second modified example of the second embodiment, and the differences thereof from the second embodiment and the first modified example thereof are described below. The differences of the second modified example of the second embodiment from the second embodiment and the first modified example thereof lie in the operations of receiving the input operations with respect to the first mora input region and the second mora input region and the setting of the search subject first mora kana notation and the search subject second mora kana notation in the setting of the search conditions in Step S2. Step S1, the operations of receiving the input operation with respect to the proximity number and the setting of the search subject proximity number in the setting of the search conditions in Step S2, Step S3, Step S4, and Step S5 of the second modified example of the second embodiment are the same as in the second embodiment and the first modified example thereof.

When neither the search subject first mora kana notation nor the search subject second mora kana notation have been set, the subject pronunciation designation unit 120 receives an input operation by the user to the input unit 200 with respect to either one of the first mora input region 321, 325 or the second mora input region 322, 326 in the book search screen displayed on the display unit 300, and sets the kana notation as the search subject mora kana notation for that input region, in other words, the search subject first mora kana notation or the search subject second mora kana notation (Step S211). Receipt of the input operation by the user to the input unit 200 in Step S211 may be carried out by receiving key input operations of one mora kana notation, or by displaying a list such as a pull-down list of kana notations in hiragana or katakana of the 107 morae that exist in Japanese, minus the syllabic nasal "n" for a total of 106 morae, and receiving a selection input operation by the user using a mouse, etc. For example, in case a pull-down list is used, if neither the search subject first mora kana notation nor the search subject second mora kana notation have been set, then, when the subject pronunciation designation unit 120 detects that a mouse pointer is hovering over the first mora input region 321 in the book search screen displayed on the display unit 300 due to a movement operation by the user of the mouse which is the input unit 200, the subject pronunciation designation unit 120 displays kana notations in hiragana or katakana of the 106 morae excluding the syllabic nasal "n" as a pull-down list on the first mora input region 321 or in the vicinity thereof, and upon receiving a selection input operation by the user using the mouse which is the input unit 200 with respect to any one mora kana notation included in the pull-down list displayed on the first mora input region 321, sets the kana notation as the search subject first mora kana notation.

When either one of the search subject first mora kana notation and the search subject second mora kana notation has been set, the subject pronunciation designation unit 120 displays, on whichever of the first mora input region 321, 325 and the second mora input region 322, 326 in the book search screen displayed on the display unit 300 that has not yet received an input operation, a list of kana notations in hiragana or katakana of morae in which the vowels are the same as in the mora kana notation set as either the search subject first mora kana notation or the search subject second mora kana notation (Step S212), and when a selection input operation by the user to the input unit 200 with respect to any one of the kana notations included in the list is received, sets the kana notation as the search subject mora kana notation for the input region, in other words, the search subject first mora kana notation or the search subject second mora kana notation (Step S213). For example, in case a pull-down list is used, if the search subject first mora kana notation has been set by an input operation with respect to the first mora input region 321 in the book search screen, then, when the subject pronunciation designation unit 120 detects that a mouse pointer is hovering over the second mora input region 322 in the book search screen displayed on the display unit 300 due to a movement operation by the user of the mouse which is the input unit 200, the subject pronunciation designation unit 120 displays kana notations in hiragana or katakana of morae in which the vowels are the same as in the search subject first mora kana notation as a pull-down list on the second mora input region 322 or in the vicinity thereof, and upon receiving a selection input operation by the user of the mouse to the input unit 200 with respect to any one of the kana notations included in the pull-down list, sets the kana notation as the search subject second mora kana notation.

Third Modified Example of Second Embodiment

The second modified example of the second embodiment imposed restrictions on a list view in the form of the pull-down list, etc. of the second embodiment and the first modified example thereof, but a book search screen including a Japanese syllabary button group may be used, whereby restrictions may be imposed on the display of the buttons. Such an embodiment is referred to as a third modified example of the second embodiment, and the differences thereof from the second embodiment and the first modified example thereof are described below. The differences of the third modified example of the second embodiment from the second embodiment and the first modified example thereof lie in the book search screen, and the operations of receiving the input operations with respect to the first mora input region and the second mora input region and the setting of the search subject first mora kana notation and the search subject second mora kana notation in the setting of the search conditions in Step S2. Step S1, the operations of receiving the input operation with respect to the proximity number and the setting of the search subject proximity number in the setting of the search conditions in Step S2, Step S3, Step S4, and Step S5 of the third modified example of the second embodiment are the same as in the second embodiment and the first modified example thereof.

<<<Book Search Screen>>>

The book search screen in the present modified example is a screen for letting a user designate a first mora kana notation and a second mora kana notation in a correct pronunciation of a set of two mora kana notations in which metathesis has occurred and a proximity number of these two mora kana notations, a screen for letting a user designate a first mora kana notation and a second mora kana notation in an incorrect pronunciation of a set of two mora kana notations in which metathesis has occurred and a proximity number of these two mora kana notations, or a screen for letting a user designate a set of two mora kana notations in which metathesis has occurred and a proximity number of these two mora kana notations.

Figure 7:
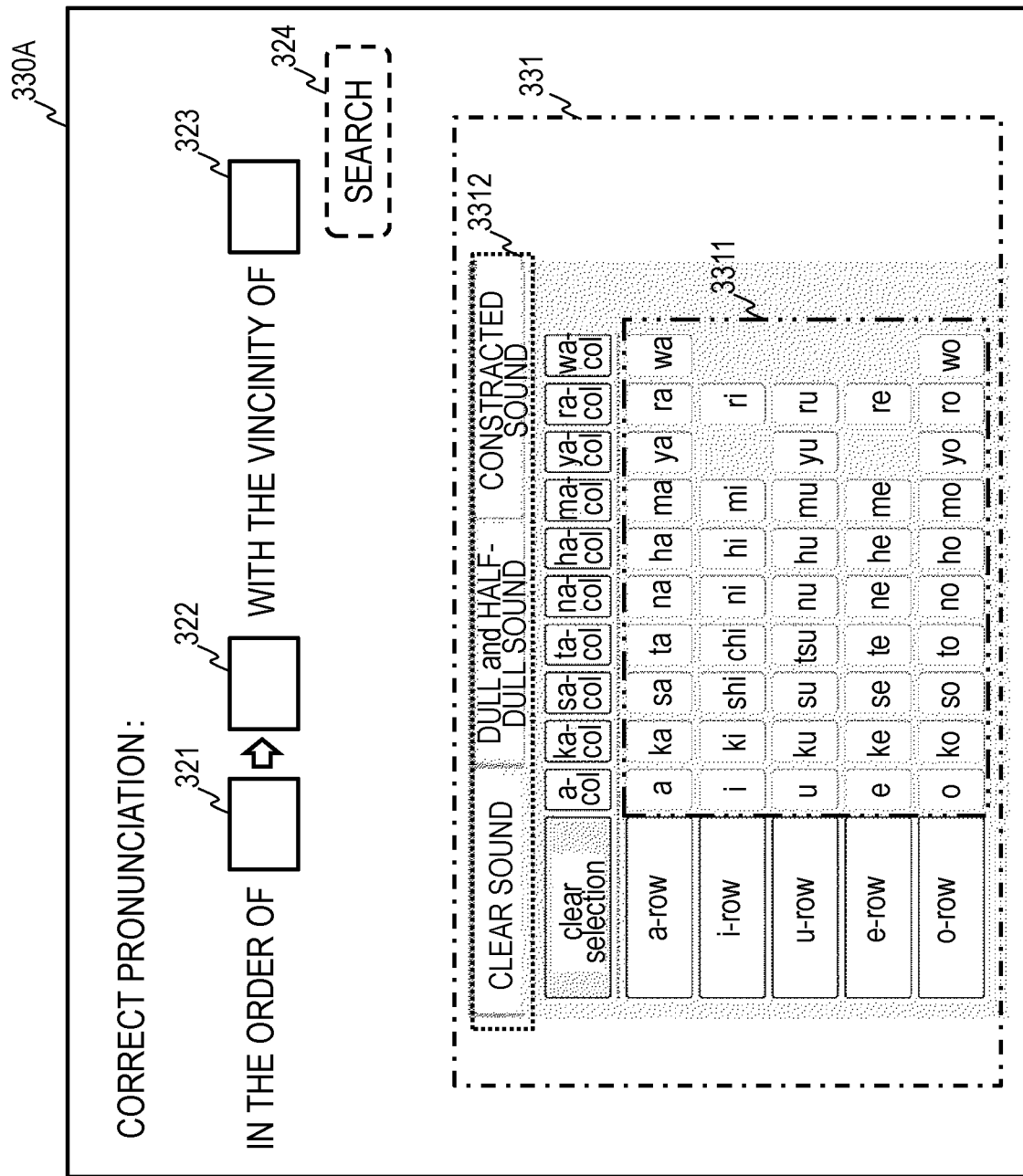
FIG. 7 is a drawing showing a display example of a book search screen according to a third modified example of the second embodiment.

A book search screen for letting a user designate a first mora kana notation and a second mora kana notation in a correct pronunciation of a set of two mora kana notations in which metathesis has occurred and a proximity number of these two mora kana notations may include, like, for example, a book search screen 330A shown in FIG. 7, a first mora input region 321 which is a region for inputting the first mora kana notation in the correct pronunciation of the set of two mora kana notations in which metathesis has occurred, a second mora input region 322 which is a region for inputting the second mora kana notation in the correct pronunciation of the set of two mora kana notations in which metathesis has occurred, a proximity number input region 323 which is a region for inputting the proximity number of the set of two mora kana notations in which metathesis has occurred, and a Japanese syllabary button group 331, and may include a search button 324 which is a button for issuing an instruction to execute a search.

Figure 8:
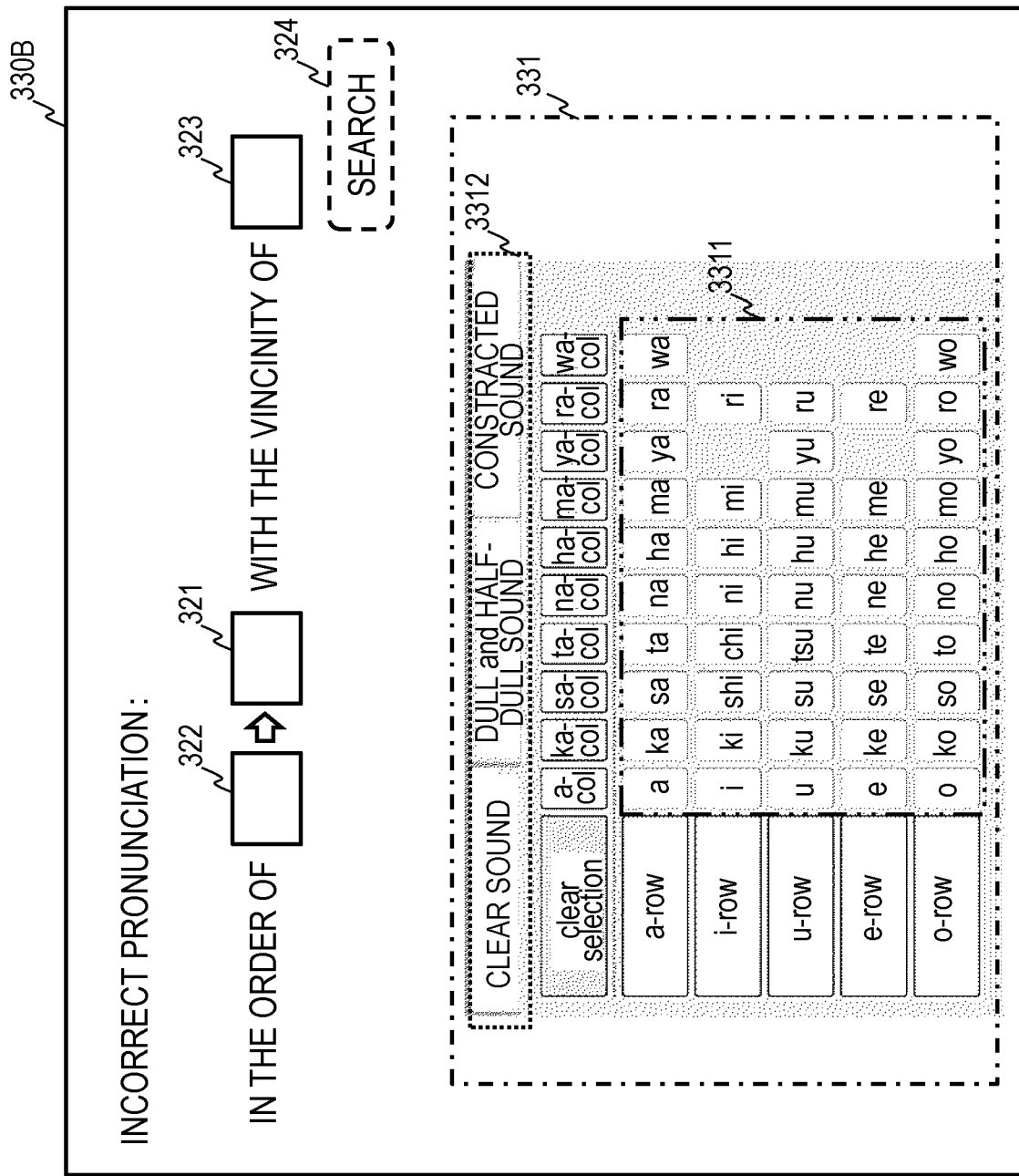
FIG. 8 is a drawing showing a display example of a book search screen according to the third modified example of the second embodiment.

A book search screen for letting a user designate a first mora kana notation and a second mora kana notation in an incorrect pronunciation of a set of two mora kana notations in which metathesis has occurred and a proximity number of these two mora kana notations may include, like, for example, a book search screen 330B shown in FIG. 8, a second mora input region 322 which is a region for inputting the first mora kana notation in the incorrect pronunciation of the set of two mora kana notations in which metathesis has occurred, a first mora input region 321 which is a region for inputting the second mora kana notation in the incorrect pronunciation of the set of two mora kana notations in which metathesis has occurred, a proximity number input region 323 which is a region for inputting the proximity number of the set of two mora kana notations in which metathesis has occurred, and a Japanese syllabary button group 331, and may include a search button 324 which is a button for issuing an instruction to execute a search.

Figure 9:
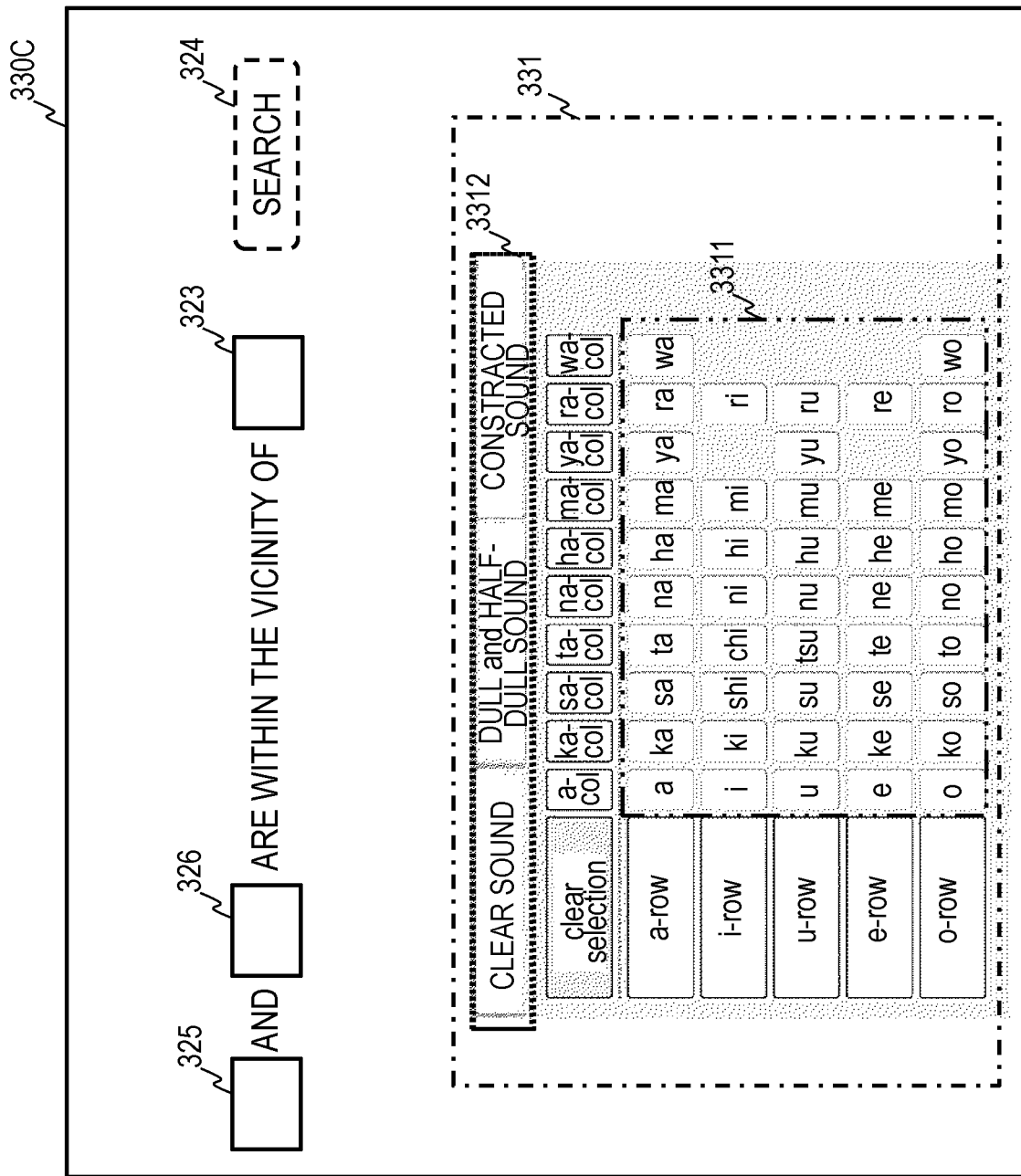
FIG. 9 is a drawing showing a display example of a book search screen according to the third modified example of the second embodiment.

A book search screen for letting a user designate a set of two mora kana notations in which metathesis has occurred and a proximity number of these two mora kana notations may include, like, for example, a book search screen 330C shown in FIG. 9, a first mora input region 325 which is a region for inputting one mora kana notation of the set of two mora kana notations in which metathesis has occurred, a second mora input region 326 which is a region for inputting the other mora kana notation of the set of two mora kana notations in which metathesis has occurred, a proximity number input region 323 which is a region for inputting the proximity number of the set of two mora kana notations in which metathesis has occurred, and a Japanese syllabary button group 331, and may include a search button 324 which is a button for issuing an instruction to execute a search.

The Japanese syllabary button group 331 is a group of buttons in which buttons corresponding one-to-one with each mora kana notation (hereinafter referred to as "kana notation buttons") are categorized by vowel and consonant. Since the Japanese syllabary ordering corresponds one-to-one with combinations of vowels and consonants, the Japanese syllabary button group 331 arranges kana notation buttons 3311 corresponding one-to-one with kana notations representing each mora in a table in which a plurality of consonants are lined up horizontally and a plurality of vowels are lined up vertically, as shown, for example, surrounded by the dash double-dot line in FIGS. 7 to 9.

It should be noted that although the Japanese syllabary button group 331 may have all kana notation buttons arranged in one table, considering the screen size and screen readability of the display unit 300, it may also be configured to arrange the buttons separately into two or more tables, and include a button 3312 (hereinafter referred to as "tab button") for selecting a table, as shown, for example, surrounded by the dashed line in FIGS. 7 to 9. For example, a table containing kana notation buttons for clear sound, a table containing kana notation buttons for dull and half-dull sound, and a table containing kana notation buttons for contracted sound are prepared, and allow for selection of which table to display by a press operation of an "clear sound" tab button, a "dull and half-dull sound" tab button, and a "contracted sound" tab button.

The character notation for the kana notation buttons may be hiragana notation, katakana notation, alphabetic character notation, or a combination of several of these notations. However, considering the objective of searching for books such as picture books and children's books, the character notation for the kana notation buttons preferably includes at least hiragana notation.

<<Set Search Conditions (Step S2)>>

Next, the book search apparatus 1 sets search conditions. Specifically, the subject pronunciation designation unit 120 receives input operations by the user to the input unit 200 with respect to the Japanese syllabary button group 331 and the proximity number input region 323 in the book search screen displayed on the display unit 300, and sets search conditions corresponding to the input operations received by the input unit 200. The search conditions set by the subject pronunciation designation unit 120 are a search subject first mora kana notation, a search subject second mora kana notation, and a search subject proximity number described below.

<<<Search Subject First Mora Kana Notation and Search Subject Second Mora Kana Notation>>>

Figure 10:
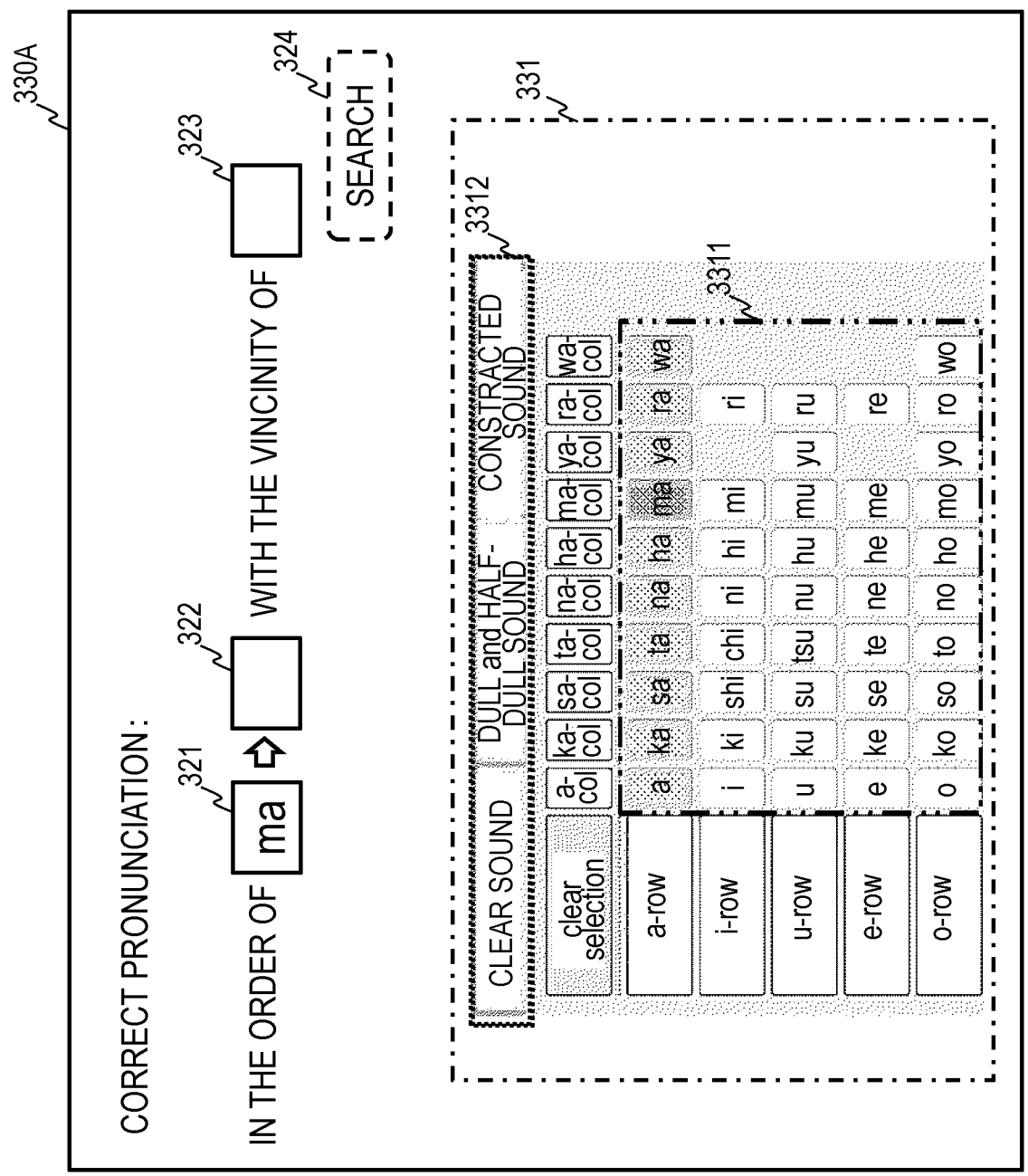
FIG. 10 is a drawing showing a display example of a book search screen according to the third modified example of the second embodiment.

The subject pronunciation designation unit 120 first receives a selection operation by the user to the input unit 200 with respect to any one kana notation button included in the Japanese syllabary button group 331, sets a mora kana notation corresponding to the kana notation button that received the selection operation as the first mora kana notation subject to search, displays the mora kana notation in the input region of the first mora kana notation, and makes a display on the kana notation button to enable visual confirmation that the mora kana notation has been set as the first mora kana notation (Step S221), and makes a display on kana notation buttons to enable visual confirmation that a mora in which the vowel is the same as in the first mora kana notation is a candidate for the second mora kana notation, and sets the mora in which the vowel is the same as in the first mora kana notation as the candidate for the second mora kana notation (Step S222). For example, in case a selection operation by a user to the input unit 200 with respect to the kana notation button "ma" has been received in the example of the book search screen in FIG. 7, the subject pronunciation designation unit 120 sets "ma" as the search subject first mora kana notation, and, as shown in FIG. 10, displays "ma" in the first mora input region 321, changes the background of the character notation of the kana notation button "ma" from white to a deep color, changes the background of the character notation of the kana notation buttons in the "a" row in which the vowel is the same as in "ma" ("a", "ka" . . . , "ha", "ya" . . . ) from white to a light color, and makes the kana notation buttons in the "a" row in which the vowel is the same as in "ma" selectable.

Figure 11:
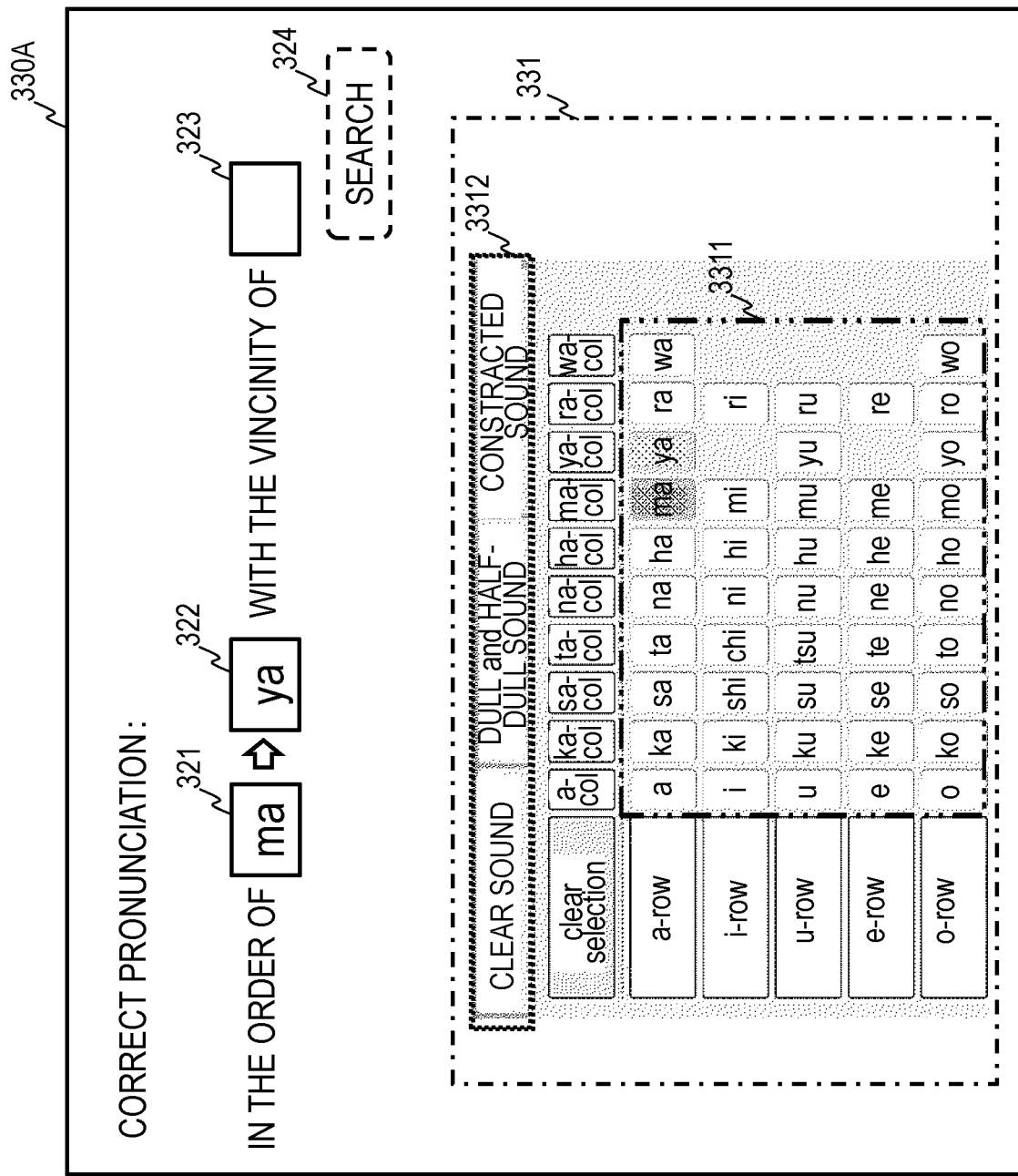
FIG. 11 is a drawing showing a display example of a book search screen according to the third modified example of the second embodiment.

Next, the subject pronunciation designation unit 120 receives a selection operation by the user to the input unit 200 with respect to any one kana notation button of the plurality of selectable kana notation buttons included in the Japanese syllabary button group 331, and sets a mora kana notation corresponding to the kana notation button that received the selection operation as a second mora kana notation subject to search, and displays the mora kana notation in the input region of the second mora kana notation, and makes a display on the kana notation button to enable visual confirmation that the mora kana notation has been set as the second mora kana notation (Step S223). For example, in case a selection operation by the user to the input unit 200 with respect to the kana notation button "ya" has been received when the book search screen is in the state shown in FIG. 10, the subject pronunciation designation unit 120 sets "ya" as the search subject second mora kana notation, and, as shown in FIG. 11, displays "ya" in the second mora input region 322, and changes the background of the character notation of the kana notation buttons in the "a" row other than "ma" and "ya" ("a", "ka" . . . , "ha", "ra" . . . ) from the light color to white.

It should be noted that instead of Step S222, the subject pronunciation designation unit 120 may make a display on the kana notation buttons to enable visual confirmation that morae in which the vowel is the same as in the first mora kana notation are recommended as candidates for the second mora kana notation (Step S222'). For example, in case a selection operation by a user to the input unit 200 with respect to the kana notation button "ma" has been received in the example of the book search screen in FIG. 7, the subject pronunciation designation unit 120 sets "ma" as the search subject first mora kana notation, and displays "ma" in the first mora input region 321, changes the background of the character notation of the kana notation button "ma" from white to a deep color, and changes the background of the character notation of the kana notation buttons in the "a" row in which the vowel is the same as in "ma" ("a", "ka" . . . , "ha", "ya" . . . ) from white to a light color, as shown in FIG. 10. However, the subject pronunciation designation unit 120 does not make the kana notation buttons in the "a" row in which the vowel is the same as in "ma" selectable, but makes all kana notation buttons other than "ma" selectable.

In this case, the subject pronunciation designation unit 120 next receives a selection operation by the user to the input unit 200 with respect to any one kana notation button of all of the kana notation buttons included in the Japanese syllabary button group 331 except for "ma", and sets a mora kana notation corresponding to the kana notation button that received the selection operation as a second mora kana notation subject to search, and displays the mora kana notation in the input region of the second mora kana notation, and makes a display on the kana notation button to enable visual confirmation that the mora kana notation has been set as the second mora kana notation (Step S223'). For example, in case a selection operation by the user to the input unit 200 with respect to the kana notation button "ya" has been received when the book search screen is in the state shown in FIG. 10, the subject pronunciation designation unit 120 sets "ya" as the search subject second mora kana notation, and, as shown in FIG. 11, displays "ya" in the second mora input region 322, and changes the background of the character notation of the kana notation buttons in the "a" row other than "ma" and "ya" ("a", "ka" . . . , "ha", "ra" . . . ) from the light color to white.

In this case, the kana notation button for the syllabic nasal "n" may be included in the Japanese syllabary button group 331, and the subject pronunciation designation unit 120 may, in case the syllabic nasal "n" has been set as the first mora kana notation in Step S221, make a display on the kana notation buttons to enable visual confirmation that there are no mora kana notations recommended as candidates for the second mora kana notation. In case the Japanese syllabary button group 331 includes tab buttons 3312, the kana notation button for the syllabic nasal "n" may be included in any table, for example, the kana notation button for the syllabic nasal "n" may be included in the table containing kana notation buttons for clear sound, and the tab button for "clear sound" may be replaced with a tab button for "clear sound and syllabic nasal".

Third Embodiment

In the first embodiment, the second embodiment, and the modified examples thereof, the search results are acquired based on a mora kana notation string of a phrase in which metathesis has occurred or a kana notation of a mora in which metathesis has occurred, but it is also possible to present intermediate search results of a search to a user, receive a selection operation by the user with respect to the intermediate search results, and acquire search results based on the received selection operation. This embodiment is described as the third embodiment.

Figure 12:
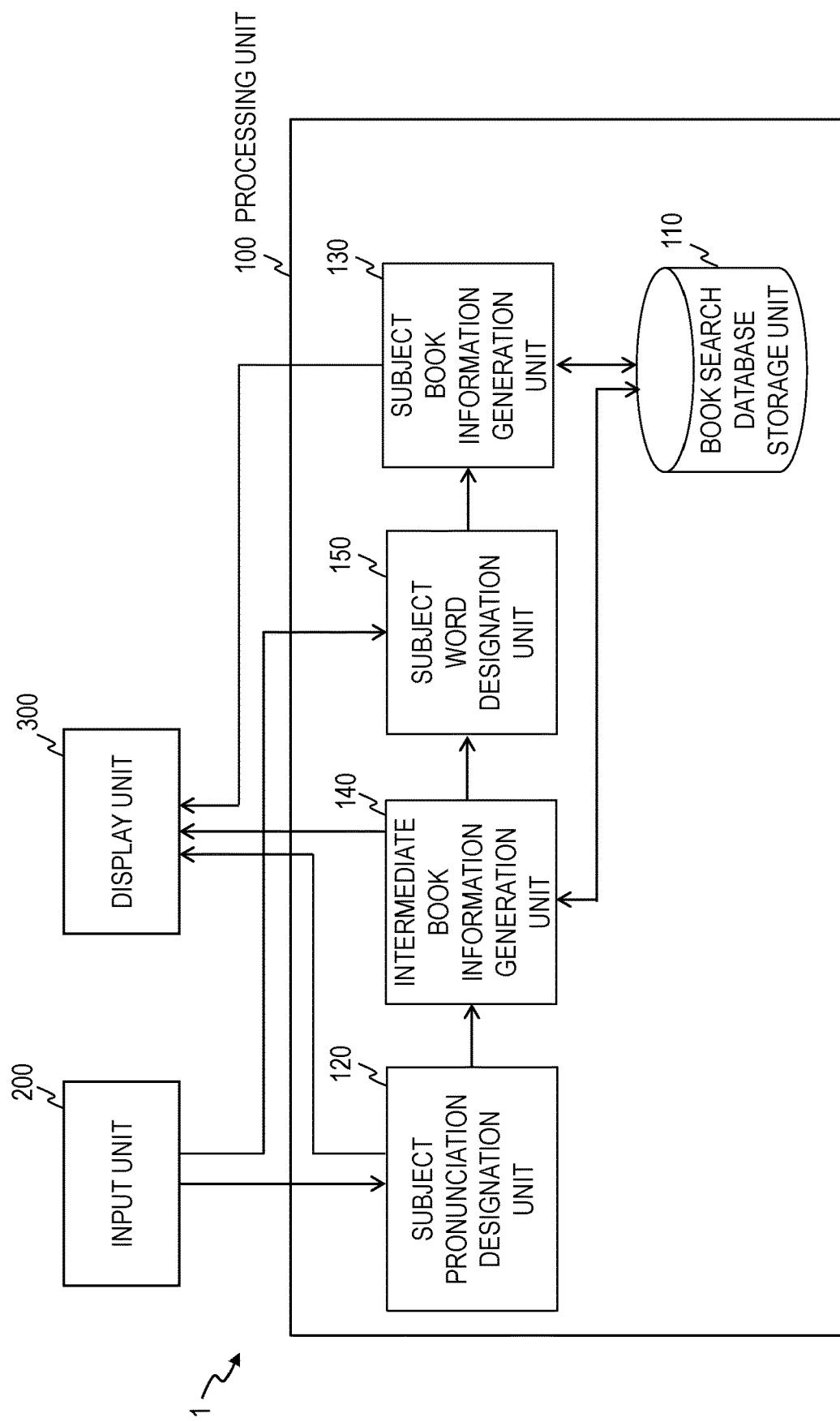
FIG. 12 is a drawing exemplifying a functional structure of a book search apparatus according to a third embodiment.

A book search apparatus according to the third embodiment has, for example, like a book search apparatus 1 exemplarily shown in FIG. 12, a processing unit 100, an input unit 200, and a display unit 300. The input unit 200 and the display unit 300 of the book search apparatus 1 according to the third embodiment are respectively identical to the input unit 200 and the display unit 300 of the book search apparatus 1 exemplarily shown in FIG. 1 described in the first embodiment. The processing unit 100 of the book search apparatus 1 according to the third embodiment differs in functional structure from the processing unit 100 of the book search apparatus 1 exemplarily shown in FIG. 1 in that in addition to a book search database storage unit 110, a subject pronunciation designation unit 120, and a subject book information generation unit 130, it also includes an intermediate book information generation unit 140 and a subject word designation unit 150.

The book search apparatus 1 according to the third embodiment, for example, allows a user to set a kana notation of a mora or a string of mora kana notations of a phrase in which metathesis has occurred using the input unit 200 while looking at a book search screen displayed on the display unit 300, searches for a picture book according to the kana notation of the mora or the string of mora kana notations of the phrase in which metathesis has occurred set by the user to acquire intermediate search results, allows a user to select a word using the input unit 200 while looking at the intermediate search results displayed on the display unit 300, searches for a picture book according to the word selected by the user to acquire search results, and displays the search results on the display unit 300, allowing the user to comprehend the search results.

The book search apparatus 1 according to the third embodiment is described below, with focus on its differences from the book search apparatus 1 according to the first embodiment, the second embodiment, and the second and third modified examples thereof.

<Book Search Database Storage Unit 110>

The book search database storage unit 110 stores a book search database. The book search database according to the present embodiment, like the book search database described in the first embodiment, stores, in association with each of a plurality of picture books, information identifying the picture book; in association with each of a certain mora kana notation pair, information regarding how frequently the mora kana notation pair appears in forward order in the vicinity of n (where n is an integer equal to or greater than 1 and equal to or smaller than N, and where N is a predetermined integer equal to or greater than 1); and, in association with each of the certain mora kana notation pair, information regarding how frequently the mora kana notation pair appears in reverse order in the vicinity of n.

The book search database according to the present embodiment further stores, in association with each of the certain mora kana notation pair, for each word in which the mora kana notation pair appears in forward order in the vicinity of n, the number of picture books in which the word appears. For example, if the words in which the mora kana notation pair "ma" and "ya" appear in forward order in the vicinity of 1 are "medamayaki" (fried egg), "amayadori" (take shelter from the rain), "amayakasu" (pamper), "komayaka" (fine), "namayasashii" (easy), and "pajamayasan" (pajama store), then the book search database stores 10, which is the number of picture books in which "medamayaki" appears; 8, which is the number of picture books in which "amayadori" appears; 3, which is the number of picture books in which "amayakasu" appears; 2, which is the number of picture books in which "komayaka" appears; 1, which is the number of picture books in which "namayasashii" appears; and 1, which is the number of picture books in which "pajamayasan" appears.

The book search database according to the present embodiment further stores, in association with each of the plurality of picture books, for each word in which the mora kana notation pair appears in forward order in the vicinity of n, the number of appearances of the word in the picture books in which it appears. For example, of the words in which the mora kana notation pair "ma" and "ya" appear in forward order in the vicinity of 1, the database stores 9, which is the number of appearances of "medamayaki" in picture book A; 7, which is the number of appearances of "medamayaki" in picture book B, and so forth.

<Operation of Book Search Apparatus 1>

An operation of the book search apparatus 1 according to the present embodiment is described below.

Figure 13:
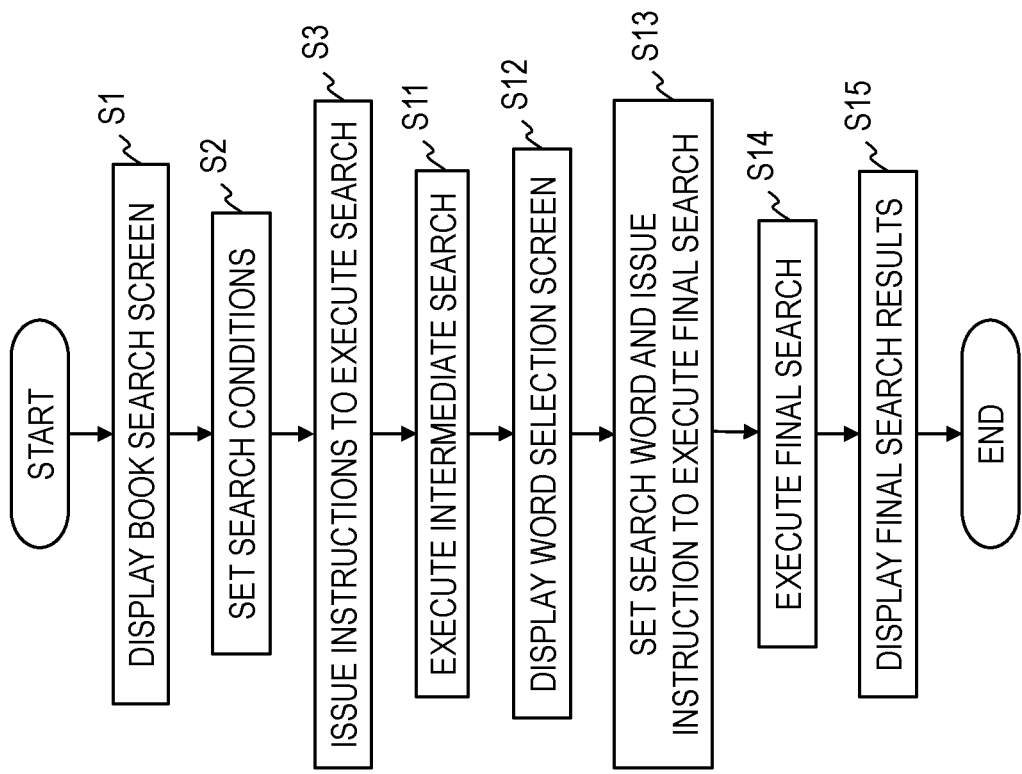
FIG. 13 is a drawing exemplifying a process sequence of a book search method according to the third embodiment.

The book search apparatus 1 starts operation triggered by an activation operation by a user. The activation operation is, for example, an operation in which a power button is pressed, etc. if the book search apparatus 1 is a dedicated terminal device, or an operation in which a program icon is pressed or a URL is designated, etc. if the book search apparatus 1 is a PC. The book search apparatus 1, triggered by the activation operation, first performs the operation of Step S1 as described in the first embodiment or the second embodiment, and further performs the operations of Step S2 and Step S3 as described in the first embodiment or the second embodiment, and then performs the operations of Step S11 to Step S15 described below (see FIG. 13). However, in the present embodiment, the search subject first mora kana notation, search subject second mora kana notation, and search subject proximity number set by the subject pronunciation designation unit 120 in Step S3 are output as search conditions to the intermediate book information generation unit 140.

<<Execute Intermediate Search (Step S11)>>

After Step S3, the book search apparatus 1 executes an intermediate search. Specifically, the intermediate book information generation unit 140 acquires intermediate search results corresponding to the input search conditions and generates and outputs a word selection screen containing the intermediate search results and word selection buttons to the display unit 300.

The intermediate search results acquired by the intermediate book information generation unit 140 are, for each word in which the set of two mora kana notations in which metathesis has occurred appears in a correct pronunciation forward order in at least any of the picture books, a set of a notation of the word and the number of picture books in which the word appears. The word selection buttons of the word selection screen generated by the intermediate book information generation unit 140 are buttons for selecting words in which the set of two mora kana notations in which metathesis has occurred appears in the correct pronunciation forward order in at least any of the picture books. The intermediate book information generation unit 140 searches the book search database stored in the book search database storage unit 110 based on the input search subject first mora kana notation, search subject second mora kana notation, and search subject proximity number M, and generates and outputs the word selection screen 350 containing the intermediate search results which are, for each word in which the set of two mora kana notations in which metathesis has occurred appears in a correct pronunciation forward order in at least any of the picture books, a set of a notation of the word and the number of picture books in which the word appears, and word selection buttons 351 for selecting a word.

<<Display Word Selection Screen (Step S12)>>

Next, the book search apparatus 1 displays the word selection screen. Specifically, the display unit 300 displays the input word selection screen 350.

FIG. 14 shows an example of the word selection screen 350 in which the contents stored in the book search database stored in the book search database storage unit 110 is as in the example described above, the search subject first mora kana notation is "ma", the search subject second mora kana notation is "ya", and the search subject proximity number M is "1". In the word selection screen 350 of FIG. 14, the notation of "medamayaki", "10", which is the number of picture books in which "medamayaki" appears, and a word selection button 351-1 for selecting "medamayaki" are arranged on one row, the notation of "amayadori", "8", which is the number of picture books in which "amayadori" appears, and a word selection button 351-2 for selecting "amayadori" are arranged on one row, and subsequently, words are arranged one on each row, down to words for which the number of picture books in which they appear is 1. In this example, words are arranged on the word selection screen 350 in descending order of the number of picture books in which they appear, but words may be arranged, for example, column by column from left to right in descending order of the number of picture books in which they appear, or in the Japanese syllabary order of the notations of the words rather than in descending order of the number of picture books in which they appear, or neither of these. That is, so long as it can be visually confirmed that the notation of the word, the number of picture books in which the word appears, and the word selection button are associated with one another, the arrangement is arbitrary. Of course, if the word selection screen 350 cannot completely fit into the screen of the display unit 300, it is possible to employ well-known screen display technology, such as adding a scroll bar to make the screen scrollable, etc.

<<Set Subject Word and Issue Instructions to Execute Final Search (Step S13)>>

Next, the book search apparatus 1 sets a search word and issues instructions to execute a final search. Specifically, the subject word designation unit 150 receives a press operation by the user to the input unit 200 with respect to any one of the word selection buttons in the word selection screen 350 displayed on the display unit 300, sets a word corresponding to the input operation received by the input unit 200 as a subject word, and outputs the set subject word as a search condition to the subject book information generation unit 130.

Of course, a configuration is possible in which the word selection screen includes a search button, wherein only the setting of the subject word is performed upon receiving the press operation by the user to the input unit 200 with respect to a word selection button, and the set subject word is output as a search condition to the subject book information generation unit 130 triggered by receipt of a press operation to the input unit 200 with respect to the search button. Alternatively, the set subject word may be output as a search condition to the subject book information generation unit 130 triggered by, for example, a right-click of a mouse or a press operation of the Return key of a keyboard.

<<Execute Final Search (Step S14)>>

Next, the book search apparatus 1 executes a final search. Specifically, the subject book information generation unit 130 acquires search results corresponding to the subject word, which is the search condition input from the subject word designation unit 150, and generates and displays a search results screen containing the search results on the display unit 300.

The search results acquired by the subject book information generation unit 130 are, for each picture book in which the input subject word appears, sets of information identifying the picture book and the number of appearances of the subject word in the picture book. The subject book information generation unit 130 searches the book search database stored in the book search database storage unit 110 based on the input subject word, acquires, for each picture book in which the subject word appears, information identifying the picture book and the number of appearances of the subject word in the picture book, and generates and outputs the search results screen containing the search results which are sets of information identifying each picture book in which the subject word appears and the number of appearances of the subject word in the picture book.

<<Display Final Search Results (Step S15)>>

Next, the book search apparatus 1 displays the final search results. Specifically, the display unit 300 displays the input search results screen.

For example, if the subject word is "medamayaki", the search results screen may be configured so that the titles of picture books in which "medamayaki" appears and the number of appearances of "medamayaki" in each picture book are arranged in association with one another. For example, the results may be arranged in descending order of number of appearances of the subject word, such as row by row from above or column by column from left to right in descending order of the number of appearances of "medamayaki", or the titles of the picture books may be arranged in Japanese syllabary order, or neither of these. That is, in the search results screen, so long as it can be visually confirmed that the information identifying the picture book and the number of appearances of the subject word are associated with each other, the arrangement is arbitrary.

Fourth Embodiment

An embodiment of a book search database generation apparatus will be described as a fourth embodiment. The book search database generation apparatus according to the fourth embodiment has, like a book search database generation apparatus 700 shown in FIG. 15, an analysis unit 710 and a plural sound vicinity information generation unit 720. The book search database generation apparatus 700 according to the fourth embodiment generates and outputs a book search database based on an input book text database. The book search database generated and output by the book search database generation apparatus 700 is stored in the book search database storage unit 110 of the book search apparatus 1 according to the embodiments and modified examples described above and is used in book searches.

<Book Text Database>

The book text database input into the book search database generation apparatus 700 stores, in association with each of a plurality of picture books, information identifying the picture book and the full text of the picture book.

<Analysis Unit 710>

The book text database input into the book search database generation apparatus 700 is input into the analysis unit 710. The analysis unit 710 performs a morphological analysis of the full text of each picture book contained in the book text database to acquire a string of morphemes corresponding to the full text, and outputs the acquired string of morphemes in association with the information identifying the picture book.

In the string of morphemes, the full text needs to be written as mora kana notations, and pauses when reading out loud, such as boundaries between words and punctuation, etc. needs to be explicitly shown. The mora kana notation needs only to be a notation that allows for the morae to be identified, and may be either hiragana or katakana, or any other kind of notation. For example, in case the text: "ojiisanhayamanishibakarini, obaasanhakawanisentakuni . . . " (the old man went to the mountain to cut grass, and the old woman went to the river to wash . . . ) is input into the analysis unit 710, then the analysis unit 710 may obtain a string of morphemes in the form of:

"ojiisan/ha/yama/ni/shibakari/ni/,/obaasan/ha/kawa/ni/sentaku/ni/ . . . "

Although the input text of actual picture books do not include kanji, notation in the example text herein includes kanji for ease of reading (This sentence is relating to explanation for Japanese description. In case of English, both of the input text of actual picture books and notation in the example text are in alphabetic character notation.).

<Plural Sound Vicinity Information Generation Unit 720>

Information identifying the picture book and the associated string of morphemes of each picture book is input from the analysis unit 710 into the plural sound vicinity information generation unit 720. The plural sound vicinity information generation unit 720 uses the input information to generate and output the information to be stored in the book search database of at least any of the first embodiment, second embodiment, modified examples of the second embodiment, and the third embodiment described above.

For example, the plural sound vicinity information generation unit 720 acquires from the input string of morphemes, for each picture book, information regarding how frequently each of a certain mora kana notation pair appears in forward order in the vicinity of n (where n is an integer equal to or greater than 1 and equal to or smaller than N, and where N is a predetermined integer equal to or greater than 1) and information regarding how frequently each of the certain mora kana notation pair appears in reverse order in the vicinity of n, and outputs a book search database in which the acquired information is associated with the input information identifying the picture books.

The information regarding how frequently a mora kana notation pair appears in forward order in the vicinity of n is, for example, a number of appearances of the mora kana notation pair in forward order in the vicinity of n in each picture book, the notation of a word in which the mora kana notation pair appears in forward order in the vicinity of n in each picture book, and the number of appearances of that word in each picture book. Similarly, the information regarding how frequently a mora kana notation pair appears in reverse order in the vicinity of n is, for example, a number of appearances of the mora kana notation pair in reverse order in the vicinity of n in each picture book, the notation of a word in which the mora kana notation pair appears in reverse order in the vicinity of n in each picture book, and the number of appearances of that word in each picture book.

In case a string of morphemes in the form of, for example:

"ojiisan/ha/yama/ni/shibakari/ni/,/obaasan/ha/kawa/ni/sentaku/ni"

has been input into the plural sound vicinity information generation unit 720, then the number of appearances of the mora kana notation pair "yama" in forward order in the vicinity of 1 is 1, the number of appearances of the word "yama", in which the mora kana notation pair "yama" appears in forward order in the vicinity of 1, is 1, the number of appearances of the mora kana notation pair "yama" in reverse order in the vicinity of 1 is 0, and the number of appearances of a word in which the mora kana notation pair "yama" appears in reverse order in the vicinity of 1 is 0.

It should be noted that even if a certain mora kana notation pair appears in forward order in the vicinity of n, this should not be counted as an appearance of the mora kana pair in forward order in the vicinity of n if it appears across a division in the text, such as across the boundary of a phrase or a sentence. Similarly, even if a certain mora kana notation pair appears in reverse order in the vicinity of n, this should not be counted as an appearance of the mora kana pair in reverse order in the vicinity of n if it appears across a division in the text, such as across the boundary of a phrase or a sentence. For example, in case a string of morphemes in the form of:

"kaguya/mata/asobi/ni/oide" (Kaguya, please come to play again)

has been input into the plural sound vicinity information generation unit 720, although "yama" appears in forward order once in the vicinity of 1, it appears across a division in the text, and therefore the number of appearances of the mora kana notation pair "yama" in forward order in the vicinity of 1 should be 0.

In addition, the plural sound vicinity information generation unit 720 may, for example, acquire the number of picture books in which a word appears in which each of a certain mora kana notation pair appears in forward order in the vicinity of n, and the number of picture books in which a word appears in which each of a certain mora kana notation pair appears in reverse order in the vicinity of n, and output them included in the book search database. Further, the plural sound vicinity information generation unit 720 may, for example, also acquire the number of appearances in each picture book of each word appearing in any picture book and output it included in the book search database.

Other Modified Examples, Etc.

It should be noted that the present invention is not limited to the above embodiments. For example, in the above embodiments a case in which the language is Japanese and picture books for toddlers are searched has been described, but the invention is applicable to any other language in which character notation and pronunciation correspond, and may be applied when searching for books such as children's books. Also, for example, the function and data of the processing unit 100 may be distributed across a plurality of devices, which may send and receive information to one another through the Internet, etc. to execute the processes described above.

When the above configuration is realized by a computer, the processing contents of the functions each device should have is described by a program. The processing functions described above are realized on the computer by executing the program on the computer. The program describing the processing contents may be recorded on a computer-readable storage medium. Examples of computer-readable storage media include non-transitory storage media. Examples of such storage media include magnetic recording devices, optical discs, magneto-optical storage media, semiconductor memories, etc.

Distribution of the program may be done through, for example, the selling, assigning, renting, etc. of portable storage media such as DVDs, CD-ROMs, etc. Further, the program may be distributed by having the program be stored on a storage device of a server computer and transferred from the server computer to other computers.

A computer that executes this kind of program, for example, first stores the program stored on a portable storage medium or the program transferred from the server computer in its own storage device. When executing the process, the computer reads the program stored in its own storage device, and executes processes according to the read program. As another way to execute the program, the computer may read the program directly from the portable storage medium and execute the process according to the program, and further, whenever the program is transferred to the computer from the server computer, the computer may sequentially execute the process according to the received program. The above process may also be executed by a so-called Application Service Provider (ASP) service, in which the process functions are realized by only acquiring execution instructions and results, without transferring the program to the computer from the server computer.

Instead of the processing functions of the present device being realized by executing a certain program on a computer, at least part of these processing functions may be realized by hardware.

REFERENCE SIGNS LIST

1 Book search apparatus
100 Processing unit
110 Book search database storage unit
120 Subject pronunciation designation unit
130 Subject book information generation unit
140 Intermediate book information generation unit
150 Subject word designation unit
200 Input unit
300 Display unit
700 Book search database generation apparatus
710 Analysis unit
720 Plural sound vicinity information generation unit

The invention claimed is:

1. A book search apparatus comprising a processor configured to execute operations comprising:
storing, in a book search database, at least first information identifying a book and second information regarding a frequency of a proximity number for a mora character notation pair appearing in forward order in the book, and the first information and the second information are associated with each other;
displaying a book search screen including two mora input regions for inputting each of two mora character notations in which metathesis has occurred included in a phrase in which metathesis has occurred, and a proximity number input region for inputting a proximity number of the two mora character notations; and
generating, from the book search database, search results including information regarding books in which the two mora character notations input into the mora input regions appear within a vicinity of the proximity number input into the proximity number input region.

2. The book search apparatus according to claim 1, wherein:
the book search screen, when a first mora character notation has been input into a mora input region of the mora input regions, displays a second mora character notation in which a vowel is the same as in the first mora character notation as a candidate for a second mora character notation.

3. The book search apparatus according to claim 1, wherein
the book search database comprises relationship information among the first information identifying the book, the second information regarding a frequency of a proximity number for a mora character notation pair appearing in forward order in the book, and third information regarding another frequency of a proximity number for a mora character notation pair appearing in reverse order in the book are associated with each other, and
wherein the search results include both information regarding how frequently the mora character notation pair appears in forward order and information regarding how frequently the mora character notation pair appears in reverse order.

4. A non-transitory tangible medium having recorded thereon a program for causing a computer to function as the book search apparatus according to claim 1.

5. The book search apparatus according to claim 1, wherein:
the book search screen, when a first mora character notation has been input into a mora input region of the mora input regions, displays a recommendation of a second mora character notation in which a vowel is the same as in the first mora character notation as a candidate for the second mora character notation.

6. A book search method, comprising:
displaying a book search screen comprising two mora input regions and a proximity number input region, wherein the two mora input regions respective receives input of each of two mora character notations in which metathesis has occurred included in a phrase in which metathesis has occurred, and the proximity number input region receives input of a proximity number of the two mora character notations; and
generating, from a book search database, search results including information regarding books in which the two mora character notations input into the mora input regions appear within a vicinity of the proximity number input into the proximity number input region, wherein the book search database associates with each other first information identifying a book and second information of a frequency of a proximity member for a mora character notation pair appearing in forward order in the book.

\* \* \* \* \*